US012780641B2

(12) United States Patent
Watt et al.

(10) Patent No.: US 12,780,641 B2
(45) Date of Patent: Nov. 3, 2026

(54) INLINE CARBONATOR

(71) Applicant: Hydration Labs, Inc., Charlestown, MA (US)

(72) Inventors: David Watt, Charlestown, MA (US); Corbin Basler, Charlestown, MA (US)

(73) Assignee: HYDRATION LABS, INC., Charlestown, MA (US)

( * ) Notice: Subject to any disclaimer, the term of this patent is extended or adjusted under 35 U.S.C. 154(b) by 537 days.

(21) Appl. No.: 18/486,560

(22) Filed: Oct. 13, 2023

(65) Prior Publication Data

US 2024/0270560 A1 Aug. 15, 2024

Related U.S. Application Data

(60) Provisional application No. 63/485,167, filed on Feb. 15, 2023.

(51) Int. Cl.
*B67D 1/00* (2006.01)

(52) U.S. Cl.
CPC ........... *B67D 1/0058* (2013.01); *B67D 1/007* (2013.01)

(58) Field of Classification Search
CPC .............................. B67D 1/007; B67D 1/0058
See application file for complete search history.

(56) References Cited

U.S. PATENT DOCUMENTS 3,761,066 A 9/1973 Wheeler
3,941,355 A * 3/1976 Simpson ............... B01F 25/434 261/DIG. 26
4,022,119 A 5/1977 Karr
6,447,158 B1 * 9/2002 Farkas .................. B01F 27/092 366/172.1
8,567,767 B2 * 10/2013 Fantappie ............... A47J 31/00 261/DIG. 7
9,878,273 B2 * 1/2018 Ergican .................. B01D 29/23
11,206,853 B2 * 12/2021 Blevins ..................... A23L 2/54
2008/0210408 A1 9/2008 Sterngold
2022/0340406 A1 10/2022 Lynch

FOREIGN PATENT DOCUMENTS

WO 01/16017 A1 3/2001

OTHER PUBLICATIONS

International Search Report and Written Opinion received in International application No. PCT/US 24/76875 mailed on Feb. 6, 2024.

* cited by examiner

*Primary Examiner* — Matthew J Kasztejna
(74) *Attorney, Agent, or Firm* — Bradley Arant Boult Cummings LLP; Adam J. Thompson

(57) ABSTRACT

An inline carbonator can include a body having inlets configured to receive water and carbon dioxide. An inline mixer can be disposed within the body and can comprise a central channel defining an inner flow path extending along the inline mixer in a first direction and a mixing unit defining an outer flow path extending along the inline mixer in a second direction that is generally opposite the first direction. The mixing unit can include a funnel structure defining a funnel flow path and a mixing wall structure having a barrier portion rotationally aligned with the funnel flow path. The inline mixer can include a plurality of mixing units that are serially arranged.

19 Claims, 12 Drawing Sheets

INLINE CARBONATOR

CROSS-REFERENCE TO RELATED APPLICATIONS

This application claims the benefit of, and priority to, U.S. Provisional Patent Application No. 63/485,167, filed Feb. 15, 2023 and entitled "INLINE CARBONATOR," the entire contents of which are hereby incorporated herein.

TECHNICAL FIELD

The present apparatuses, systems, and methods relate generally to liquid carbonation and, more particularly, to carbonating water by combining carbon dioxide and water through a multi-leveled inline carbonator system.

BACKGROUND

Carbonating water is an integral step towards preparing and dispensing sodas and other carbonated beverages. The process involves combining water and carbon dioxide to form carbonated water. Typically, this combination is accomplished in a carbonator tank or other large container. In many instances, the systems used to produce carbonated water are bulky and complex based at least in part on the size of the carbonator, which can result in the overall beverage system (e.g., drink dispenser), which includes the carbonation system, having an undesirably large size and/or footprint.

Further, existing systems are generally designed to form carbonated water by forcing water and carbon dioxide together via brute force (e.g., pressurization of the water and the carbon dioxide). That is to say, existing systems are typically designed to combine water and carbon dioxide without any contemplation of the size or shape of the carbon dioxide bubbles as they are combined with the water. Thus, certain systems can be prohibitively large for installation in certain beverage systems or at certain locations. Accordingly, existing systems can be designed to inefficiently carbonate water and/or can have inefficient designs.

Therefore, there is a long-felt but unresolved need for a system or method that can carbonate water in a compact system and/or can maximize carbon dioxide dissolution into the water.

BRIEF SUMMARY OF THE DISCLOSURE

Briefly described, and according to one embodiment, aspects of the present disclosure generally relate to systems and methods for carbonating liquids. The disclosed system can include an inline carbonator. The inline carbonator can be attached to, or otherwise integrated with, a beverage dispensing system to facilitate forming carbonated water and/or forming and dispensing a carbonated beverage. The inline carbonator can include a series of interconnected funnels and mixing walls for stimulating turbulence between water and carbon dioxide ($CO_2$). The mixing walls can act as collision points to stimulate carbon dioxide uptake into the water.

The inline carbonator can include an inline mixer, an intake cap, and an inline container. The inline container can receive the inline mixer. The inline container can connect to the intake cap and can lock the inline mixer in a sealed environment.

The carbonation process can commence by flowing water and carbon dioxide into the inline container through the intake cap. In various embodiments, the carbon dioxide and water mixture are inserted into the inline carbonator at a high speed and pressure. In some embodiments, the water is kept at a temperature near freezing to enhance its carbon dioxide uptake. In at least one embodiment, the carbon dioxide and water mixture is directed through a central channel of the inline mixer in a first direction away from the intake cap. The water can reach a base of the inline container and redirect in a second direction. In at least one embodiment, the second direction is opposite the first direction. The inline mixer can include an outer pathway that extends from the surface of the central channel. The outer pathway can include a series of mixing units that direct the carbon dioxide and water mixture towards the intake cap. As the carbon dioxide and water mixture move towards the intake cap, the carbon dioxide and water progress through the mixing units. The mixing units can include various funnels and mixing walls to stimulate turbulence and carbon dioxide bubble elongation in the mixture. The mixing units can induce carbonation in the water. Once the carbon dioxide and water mixture reach the end of the outer pathway, the water can be considered fully carbonated. The carbonated water is expelled from the inline carbonator through an exit tube and used for further processes.

The disclosed technology includes an inline carbonator. The inline carbonator can include a body, and the body can include a first inlet and a second inlet. The first inlet can be configured to receive a first fluid, and the second inlet can be configured to receive a second fluid. The inline carbonator can include an inline mixer disposed within the body. The inline mixer can include a central channel and a mixing unit. The central channel can being in fluid communication with the first inlet and the second inlet, and the central channel can be define an inner flow path configured to transport a combination of the first and second fluids along the inline mixer in a first direction. The mixing unit can define an outer flow path that is in fluid communication with the inner flow path. The outer flow path can be configured to transport the combination of the first and second fluids along the inline mixer in a second direction that is generally opposite the first direction.

The mixing unit can include a funnel structure and a mixing wall structure. The mixing wall structure can include a mixing wall flow path defined at least in part by a gap between an outer edge of the mixing wall structure and an interior surface of the body of the inline carbonator. Alternatively or in addition, the mixing wall structure can include a mixing wall flow path defined by an aperture extending through the mixing wall structure.

The mixing wall structure can have an approximately hyperbolic paraboloid shape. The mixing wall structure can include a barrier portion rotationally aligned with a funnel flow path of the funnel structure, and the barrier portion can include at least some of a convex portion of the approximately hyperbolic paraboloid shape, with the convex portion being defined relative the second direction.

The mixing unit can include a funnel structure having two or more funnel flow paths, and the mixing unit can include a mixing wall structure having two or more barrier portions. Each barrier portion can be rotationally aligned with a corresponding one of the two or more funnel flow paths. The two or more funnel flow paths can be positioned equidistantly along a perimeter of the mixing unit.

The mixing wall structure can further comprise a mixing wall flow path configured to permit the first and second fluids to flow therethrough to pass the mixing wall structure. The mixing unit can comprise two or more mixing wall flow paths. The two or more barrier portions and the two or more mixing wall flow paths can be alternatingly arranged. Alternatively or in addition, the two or more barrier portions and the two or more mixing wall flow paths can be positioned equidistantly along a perimeter of the mixing unit.

The body can comprise a cap and an inline container. The cap can be detachably attachable to the inline container.

The inline container can include a plurality of locking pins, and the cap can include a plurality of locking notches. Each of the plurality of locking notches can be configured to at least partially receive a corresponding one of the plurality of locking pins.

The disclosed technology includes a beverage system. The beverage system can comprise a water source, a carbon dioxide source, and an inline carbonator. The inline carbonator can comprise a body and an inline mixer disposed within the body. The body can include a water inlet configured to receive water from the water source, a carbon dioxide inlet configured to receive carbon dioxide from the carbon dioxide source, and an outlet configured to discharge a carbonated water solution. The inline mixer can comprise a plurality of mixing units arranged in a stacked configuration. The plurality of mixing units can be configured to combine the water and the carbon dioxide into the carbonated water solution, and each of the plurality of mixing units can comprise a funnel structure and a mixing wall structure. The mixing wall structure can comprise a barrier portion that is rotationally aligned with a funnel flow path associated with the funnel structure of the corresponding mixing unit of the plurality of mixing units.

The inline mixer can further comprise a central channel in fluid communication with the water inlet and the carbon dioxide inlet. The central channel can define an inner flow path configured to transport the water and the carbon dioxide along the inline mixer in a first direction. The plurality of mixing units can define an outer flow path that is in fluid communication with the inner flow path, and the outer flow path can be configured to transport and combine the water and the carbon dioxide along the inline mixer in a second direction that is generally opposite the first direction.

The plurality of mixing units can be positioned such that a funnel flow path of each of the plurality of mixing units is rotationally aligned with a funnel flow path of an adjacent one of the plurality of mixing units. Alternatively, the plurality of mixing units can be positioned such that a funnel flow path of each of the plurality of mixing units is rotationally offset relative with a funnel flow path of an adjacent one of the plurality of mixing units.

The barrier portion can be a first barrier portion. For each of the plurality of mixing units, the funnel structure can include a first funnel flow path and a second funnel flow path, and the mixing wall structure can further comprise a second barrier portion, a first mixing wall flow path, and a second mixing wall flow path.

The disclosed technology can include a method for carbonating water. The method can comprise receiving water from a water supply at a first inlet of an inline carbonator and receiving carbon dioxide from a carbon dioxide supply at a second inlet of an inline carbonator. The method can comprise combining a flow of the water and a flow of the carbon dioxide within the inline carbonator to form a combined fluid flow. The method can include sequentially directing the combined fluid flow through a central channel of the inline carbonator and through an outer flow path of the inline carbonator. The combined fluid flow can flow through the central channel in a first general direction. The outer flow path can be (i) located radially outward from the central channel and (ii) comprising a funnel defining a funnel flow path and a mixing wall comprising a barrier portion and a mixing wall flow path. The combined fluid flow can flow through the outer flow path in a second general direction opposite the first general direction. Directing the combined fluid flow through the outer flow path of the inline carbonator can cause the combined fluid flow to flow through the funnel in the second general direction via the funnel flow path, exit the funnel and impact the barrier portion of the mixing wall, flow along the barrier portion in a direction at least partially perpendicular to the second general direction, and flow through the mixing wall flow path at least partially in the second general direction to pass the mixing wall.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
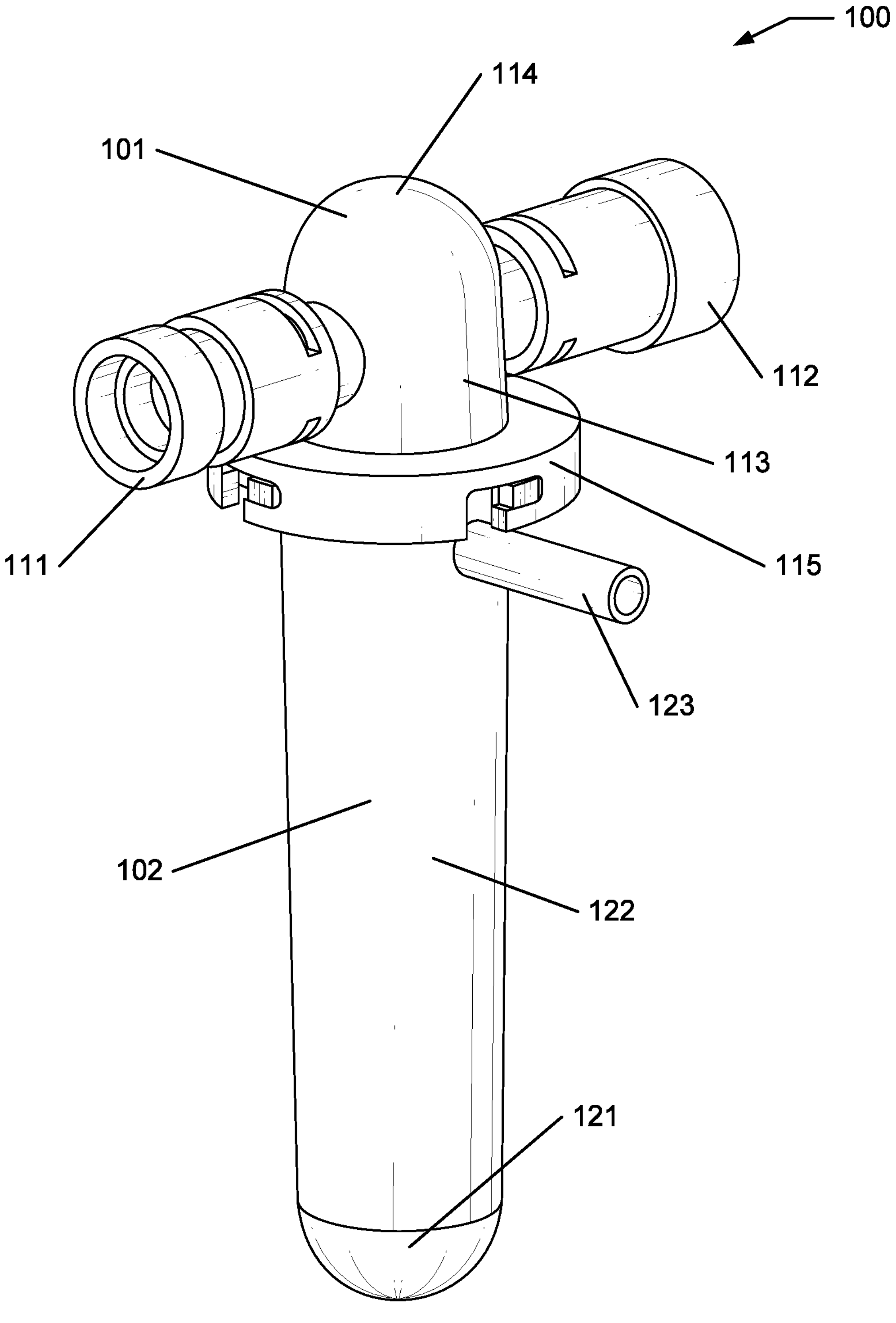
FIG. 1 illustrates a perspective view of an inline carbonator, in accordance with the disclosed technology.

The disclosed technology relates generally to apparatuses, systems, and methods for carbonating a liquid and, more particularly, to carbonating water by combining carbon dioxide and water. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for carbonating water through an inline carbonator system. The inline carbonator can include an inline mixer, an intake cap, and/or an inline container. The inline mixer, the intake cap, and/or the inline container can combine to from a carbonation system for mixing water and carbon dioxide.

The intake cap can include a first intake and a second intake. The first intake can connect to a water source, and the second intake can connect to a carbon dioxide source. The first intake and the second intake can facilitate transferring water and carbon dioxide into the inline carbonator. As carbon dioxide and water are transferred into the intake cap, the carbon dioxide and water begin to mix. The carbon dioxide and water can be sent into and/or through the intake cap at a high speed, pressure, and volume. Providing carbon dioxide and water at high speed and pressure can enhance the carbonation of the water. The carbon dioxide and water can begin to mix in the intake cap. The pressure of the carbon dioxide and water entering the intake cap can induce a flow of carbon dioxide and water through the inline mixer. The inline mixer can be housed within the inline container. The inline mixer can include a central channel and a series of mixing units. The mixing units can be located on the exterior of the central channel. For example, the mixing units can be located at positions that are radially outward from the central channel. The carbon dioxide and water mixture can progress through the central channel of the inline mixer in a first direction away from the intake cap.

When the carbon dioxide and water makes contact with a base of the inline container, the carbon dioxide and water can be redirected in a second direction into the series of mixing units. In various embodiments, the second direction is opposite of the first direction. The inline mixer can include a series of adjacent mixing units on two oppositely placed sides of the inline mixer. For example, a first set of mixing units can be at a location 180 degrees from the second set of mixing units. The mixing units can include a series of funnels and mixing walls placed above one another that can direct the flow of carbon dioxide and water towards the intake cap. The funnel can accelerate the carbon dioxide and water mixture into the mixing wall. The mixing wall can promote turbulent flow and carbon dioxide bubble elongation. By elongating carbon dioxide bubbles, the water can increase its ability to uptake carbon dioxide. The water and carbon dioxide mixture can continue along the second direction until it reaches the end of the last mixing unit. Once at the end of the last mixing unit, the water can be considered carbonated water. In various embodiments, the carbonated water is expelled from the inline carbonator through an exit tube for further use.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

EXEMPLARY EMBODIMENTS

Referring now to the figures, for the purposes of example and explanation of the fundamental processes and components of the disclosed systems and processes, FIG. 1 illustrates an example inline carbonator 100, according to one or more embodiments. As will be understood and appreciated, the inline carbonator 100 shown in FIG. 1 represents merely one approach or embodiment of the present system, and other aspects are used according to various embodiments of the present system. The inline carbonator 100 can enable mixing carbon dioxide and water to form a carbonated solution. The inline carbonator 100 can be installed into, or otherwise placed in fluid communication with, a beverage dispensing machine and/or any particular system that may require a carbonated solution. For example, the inline carbonator 100 can supply carbonated water to a beverage dispensing machine for creating carbonated drinks.

The inline carbonator 100 can include an intake cap 101 and an inline container 102 (e.g., a body). The intake cap 101 include a first intake 111, a second intake 112, an intake wall 113, an intake head 114, and a base 115. The intake cap 101 can demarcate the initial location where carbon dioxide and water are transferred into the inline carbonator 100. The first intake 111 and the second intake 112 can each receive either water, carbon dioxide, or a combination of the two. For example, the first intake 111 can attach to a tube, hose, and/or any system for supplying water. Continuing this example, the second intake 112 can attach to a tube, hose, and/or any particular system for supply carbon dioxide.

The first intake 111 and the second intake 112 extend from the intake wall 113. The first intake 111 can have a first central axis extending in a first direction toward a central axis of the inline carbonator 100, and the second intake 112 can have a second central axis extending in a second direction toward the central axis of the inline carbonator 100. The first central axis and the second central axis can intersect. That is to say, the direction of a flow of fluid through the first intake 111 can converge with, or otherwise intersect, the direction of a flow of fluid through the second intake 112. As such, the fluids flowing through the first and second intakes 111, 112 can converge and begin to mix.

The first central axis can extend in a generally radial direction relative the central axis of the inline carbonator 100, and/or the second central axis can extend in a generally radial direction relative the central axis of the inline carbonator 100. Alternatively or in addition, the first central axis can extend in an at least partially radial direction relative the central axis of the inline carbonator 100, and/or the second central axis can extend in an at least partially radial direction relative the central axis of the inline carbonator 100. For example, one or both of the first and second central axes can extend in a direction that is partially radial and partially axial relative the central axis of the inline carbonator 100.

The first direction can be generally opposite the second direction. For example, the first central axis can be approximately equal to the second central axis (i.e., the direction of flow of fluid through the first intake 111 can be approximately 180° relative the direction of flow of fluid through the second intake 112). As another example, the first and second axes can be approximately equal and can both extend in fully radial directions relative the central axis of the inline carbonator 100. Positioning the first intake 111 opposite from the second intake 112 can induce vigorous mixing of the carbon dioxide and the water. For example, by placing the first intake 111 and the second intake 112 oppositely from one another, carbon dioxide and water can be input into the intake cap 101 at high speeds and pressure to induce a collision between the two substances. Continuing this example, the oppositely flowing carbon dioxide and water can combine to form a carbonated solution.

The intake wall 113 and the intake head 114 can contain the carbon dioxide and water received by the intake cap 101. The intake head 114 can extend from the intake wall 113 and can form a substantially rounded surface. For example, the intake head 114 can have a shape substantially similar to a hemisphere. The wall 113 can have a shape substantially similar to a conical fulcrum, cylinder, rectangle, and/or any suitable polyhedron. The intake cap 101 can have a material thickness sufficiently high to withstand the pressures produced by supplying carbon dioxide and water at high velocity and pressure into the intake cap 101. For example, the intake cap 101 can be formed from and/or comprise a polymer, a metal, a composite material, a plastic, and/or any other material that can withstand the pressure produced by supply carbon dioxide and water into the inline carbonator 100.

The inline carbonator 100 can receive carbon dioxide and water at a high speed and pressure. By receiving water and carbon dioxide at a high speed and pressure, the inline carbonator 100 can sustain a vigorous flow and sufficient pressure for inducing carbonation of water.

The pressure within the intake cap 101 can induce a flow of carbon dioxide and water through an inline mixer 301 (see FIG. 3) within the inline container 102. The hemispherical shape of the intake head 114 can help direct flow in a direction towards the inline container 102 and the inline mixer 301. The inline container 102 can be made from a substantially similar material as the intake cap 101. The inline container 102 can withstand the pressure produced from the carbon dioxide and water. The inline container 102 can include an open end and a closed end or container base 121. The open end of the inline container 102 can be configured to connect to the base 115 of the intake cap, as described more fully herein. The inline container 102 can include a container wall 122 that extends from the open end to the container base 121. The container base 121 can extend from the container wall 122. The container base 121 can have a substantially similar shape as the intake head 114. For example, the container base 121 can include a hemispherical shape. The hemispherical shape of the container base 121 can induce flow from the carbon dioxide and water in a direction towards the intake cap 101. The carbon dioxide and water can travel back through the inline mixer 301 and continue to combine to form carbonated water. Once fully carbonated, the inline carbonator 100 can release the carbonated water through an outlet or exit tube 123. The exit tube 123 can supply carbonated water to other components in the particular system. While the exit tube 123 is shown as extending radially outward from the inline carbonator, the disclosed technology is not so limited. For example, the exit tube 123 can extend in an axial direction or in a combination of radial and axial directions.

Figure 2:
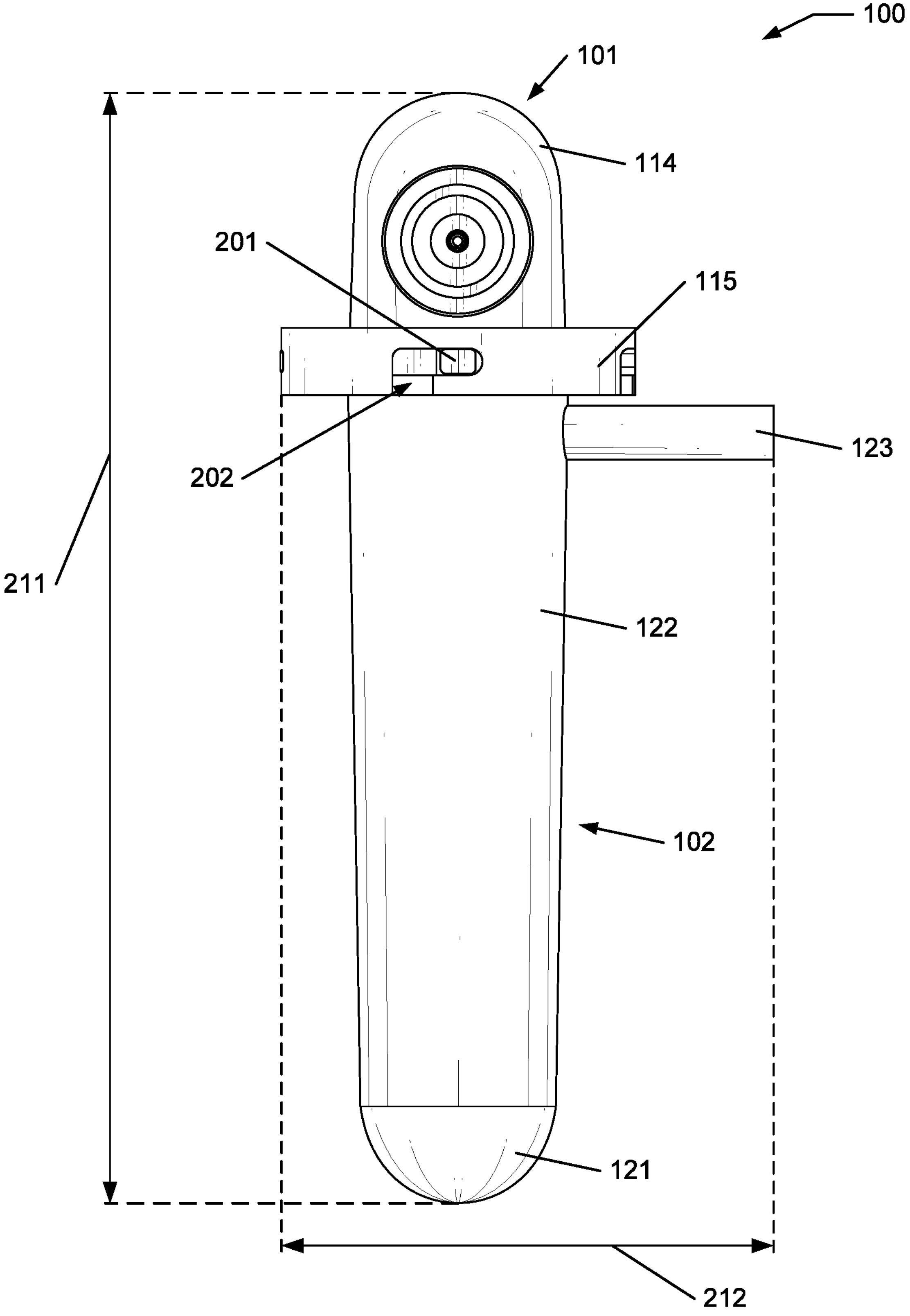
FIG. 2 illustrates a side view of the inline carbonator, in accordance with the disclosed technology.

Referring now to FIG. 2, illustrated is a side view of the inline carbonator 100, according to one example of the present disclosure. In at least one embodiment, the inline carbonator 100 is separable. That is to say, the intake cap 101 can be detachably attachable to the inline container 102. Stated otherwise, the inline container 102 can disconnect from the intake cap 101. Separating the intake cap 101 and the inline container 102 can facilitate removal of the inline mixer 301. For example, if a user would like to clean the inline carbonator 100 by accessing the internal components, the intake cap 101 can be separated from the inline container 102.

The inline container 102 can secure to the intake cap 101 by using at least one locking pin 201. The locking pin 201 can be or include a protrusion, and the locking pin 201 can extend from the container wall 122 (e.g., radially outward). The locking pins 201 can couple into at least one locking notch 202 at the base 115 of the intake cap 101. Alternatively or in addition, one or more locking pins 201 can be located on the inline container 102, and one or more corresponding locking notches 202 can be located on the intake cap 101. In one or more embodiments, the number of locking pins 201 and the number of locking notches 202 are equal to enable locking and securing the intake cap 101 to the inline container 102. For example, the locking notches 202 can be placed over the locking pins 201. Continuing this example, once the intake cap 101 is sufficiently placed onto the locking pins 201, the intake cap 101 may be rotated into a locked position. In the locked position, the locking notches 202 can securely holds onto the locking pins 201 to restrict the vertical and/or horizontal movement of the intake cap 101 relative to the inline container 102. The inline container 102 can detach from the intake cap 101 by rotating in the opposite direction of rotation during locking.

The locking pins 201 can extend from the container wall 122. In certain embodiments, the locking pins 201 can include structural supports to distribute the pressure applied to the locking pins 201 when in a locked position with the locking notches 202 of the intake cap 101. For example, the base of the locking pins 201 can include tapered edges to distribute force applied onto the locking pins 201. The locking notches 202 can receive the locking pins 201. When the intake cap 101 is rotated about the inline container 102, the locking pins 201 can secure into the locking notches 202 of the intake cap 101.

While the securing mechanism is illustrated as including a locking pin 201 and locking notch 202, the disclosed technology is not so limited. For example, alternatively or in addition, the intake cap 101 can be secured to the inline container 102 via a threaded connection (e.g., mating threads located on an internal surface of the intake cap 101 and an external surface of the inline container 102, mating threads located on an external surface of the intake cap 101 and an internal surface of the inline container 102), snap connectors, removable fasteners, or any other attachment device or mechanism.

In certain embodiments, the inline carbonator 100 includes a total height 211. The total height 211 of the inline carbonator 100 can extend from the intake head 114 to the container base 121. The total height 211 can measure at least approximately 5.0 inches, between approximately 5.0 inches and approximately 30.0 inches, between approximately 5.0 inches and approximately 15.0 inches, between approximately 15.0 inches and approximately 25.0 inches, between approximately 25.0 inches and approximately 30.0 inches, or less than approximately 30.0 inches. The inline carbonator 100 can include a total width 212. The total width 212 can measure from the end of the exit tube 123 to the opposite end of the base 115. The total width can measure at least approximately 1.0 inch, between approximately 1.0 inches and approximately 10.0 inches, between approximately 1.0 inches and approximately 5.0 inches, between approximately 5.0 inches and approximately 10.0 inches, or less than approximately 10 inches.

Figure 3:
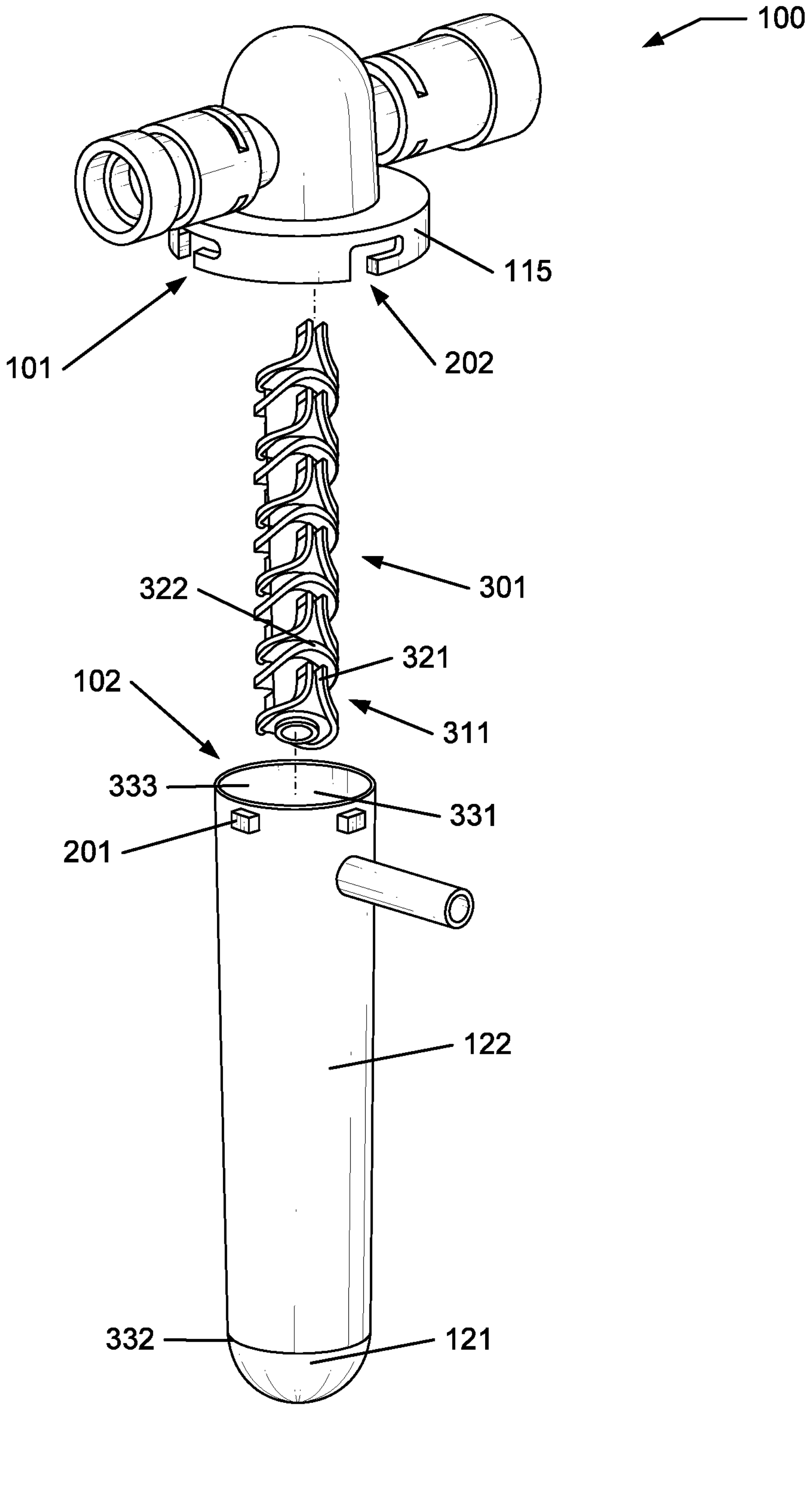
FIG. 3 illustrates an exploded view of the inline carbonator, in accordance with the disclosed technology.

Referring now to FIG. 3, illustrated is an exploded view of the inline carbonator 100, according to one example of the present disclosure. The inline carbonator 100 can include the inline mixer 301. The inline mixer 301 can extend axially within the inline container 102. For example, the inline mixer 301 can extend from a container aperture 331 at the open end of the inline container 102 to a merging line 332. The merging line can be or represent a stop that prevents the inline mixer 301 from extending closer to the end of the container base 121. As such, a gap can be created and maintained between the end of the inline mixer 301 and the container base 121, which can permit fluids to flow therebetween, as discussed more fully herein. In at least one embodiment, the merging line 332 is located between the container wall 122 and the container base 121.

The inline mixer 301 can include a central flow path that can extend in an axial direction. Thus, fluid can flow from the first and second intakes 111, 112 and through a central flow path (i.e., within the central channel 401 as discussed more fully herein) to the opposite end of the inline carbonator 100 (e.g., the container base 121).

The inline mixer 301 can include at least one mixing unit 311. The inline mixer 301 can include a series of mixing units 311 stacked vertically above one another. The inline mixer 301 can include a first set of stacked mixing units 311 oppositely positioned from a second set of stacked mixing units 311. For example, the first set of mixing units 311 can extend up the inline mixer 301 towards the intake cap 101 and the second set of mixing units 311 can extend up the inline mixer 301 towards the intake cap 101 at a position 180 degrees from the first set of mixing units 311. In certain embodiments, the mixing unit 311 can include a funnel 321 and mixing wall 322. The mixing units 311 can promote carbonation of water during use. The funnel 321 can direct a flow of carbon dioxide and water into the mixing wall 322. As discussed in further detail herein, the funnel 321 can increase the velocity of the carbon dioxide and the water passing through the funnel 321, which in turn can elongate the gas bubbles and increase the surface area of each gas bubble. By increasing the surface area of the carbon dioxide passing through the funnel 321, the funnel 321 promotes greater absorption of the carbon dioxide in the water. The funnel 321 can direct the carbon dioxide and water mixture into the mixing walls 322. The mixing wall 322 can elongating carbon dioxide bubbles. The carbon dioxide and water mixture can collide with the mixing wall 322. The collision of the carbon dioxide and water mixture into the mixing wall 322 can promote turbulent flow in carbon dioxide and water mixture. By elongating the carbon dioxide bubbles, the carbon dioxide bubbles can increase in surface area. The increased surface area of the carbon dioxide bubbles can promote absorption of carbon dioxide into the water.

In particular embodiments, the inline mixer 301 is manufactured as an independent component with respect to the inline container 102. For example, the inline mixer 301 can be an individual component that can be removed from and/or inserted into the inline container 102. Alternatively, the inline container 102 and the inline mixer 301 can be manufactured as one individual component. For example, the inline mixer 301 can be integrated into the inline container 102 as one continuous component. The components of the inline carbonator 100 can be manufactured using additive printing techniques, injection molding, compression molding, vacuum casting, rotational molding, and/or any adequate manufacturing technique. In various embodiment, the component of the inline carbonator 100 are formed from Polyoxymethylene (Delrin), Polypropylene (PP), Polyethylene Terephthalate (PETE or PET), Polyvinyl Chloride (PVC), Acrylonitrile-Butadiene-Styrene (ABS), a composite plastic material, a composite material, a metal material, a metal alloy, and/or any adequate material for withstanding high pressures during use.

The inline mixer 301 can have a diameter approximately equal to the internal diameter of the inline container 102. The inline mixer 301 can have a diminishing diameter to match the internal diameter reduction of the inline container 102. For example, as the inline mixer 301 extends through the inline container 102, the inline mixer 301 can form a flush contact with an interior surface 333 of the inline container 102 as the inline mixer 301 extend through the inline container 102. The inline mixer 301 can form a flush contact with the interior surface 333 to create a fluid-tight seal for carbon dioxide and water flowing through a given mixing unit 311 of the inline mixer 301. For example, as the carbon dioxide and water progress through the inline mixer 301, the carbon dioxide and water can travel through the predefined paths of the inline mixer 301 and can be prevented from escaping or flowing through any unintended paths, as described more fully herein. In a configuration where the inline mixer 301 is integrated into the inline container 102 as a single component, certain portions of the inline mixer 301 can form a bond with, or be integral to, the interior surface 333 of the inline container 102, restricting flow through only the predefined paths. For example, the walls forming the funnel 321 can abut or be integral with the interior surface 333 of the inline container 102 such that fluid must flow through the passage of the funnel 321 to move past the funnel 321 portion of the mixing unit 311. Similarly, some portions of the mixing wall 322 can abut, or be integral with, the interior surface 333 of the inline container 102, while other portions of the mixing wall 322 can be spaced apart from the interior surface 333 of the inline container 102.

As previously mentioned, the mixing unit 311 can include a funnel 321 and a mixing wall 322. The funnel 321 can include one or more walls configured to create a funnel flow path extending in a generally axial direction relative a central axis (e.g., a central longitudinal axis) of the mixing unit 311. The wall(s) of the funnel 321 can abut, or be integral with, the interior surface 333 of the inline container 102 such that fluid is permitting to bypass the funnel 321 only via the funnel flow path of the funnel 321. Some of the wall(s) of the funnel 321 can extend in a direction that is generally perpendicular to the axial direction ("axially perpendicular direction") (or at least partially in the axially perpendicular direction). To form the funnel flow path, a first wall portion (e.g., a distinct wall, a distinct wall section, a first end of a continuous wall) can transition to a generally axial direction. Similarly, a second wall portion (e.g., a distinct wall, a distinct wall section, a second end of a continuous wall) can transition to a generally axial direction. The first and second wall portions can taper toward one another to provide a funnel-like shape and/or effect. That is to say, the first and second wall portions can taper toward one another but maintain a gap or distance between them so as to permit fluid to flow therebetween. As shown, the funnel flow path can be defined at least in part by the interior surface 333 of the inline container 102, but it is contemplated that the funnel flow path can be defined entirely by the mixing unit 311 (e.g., a radially outermost wall can be integral with the mixing unit 311 and distinct from the inline container 102). The mixing unit 311 can include a single funnel 321. Alternatively, the mixing unit 311 can include two or more funnels 321, as described more fully herein.

The mixing wall 322 can include a single, continuous wall. Alternatively, the mixing wall 322 can include two or more walls or wall sections. The mixing wall 322 can have a generally saddle-like shape. For example, the shape of the mixing wall 322 can be a hyperbolic paraboloid or similar to a hyperbolic paraboloid. Regardless of the actual shape of the mixing wall 322, the mixing wall 322 can include one or more barrier portions that abut, are integral with, or are otherwise fluid-tight with the interior surface 333 of the inline container 102. The mixing wall 322 can also include one or more mixing wall flow paths, which can be configured to permit a fluid to flow therethrough. The mixing wall flow path can be defined by a gap or distance between an outer edge of the mixing wall 322. Alternatively, the mixing wall flow path can be defined as an aperture extending through the mixing wall. The barrier portion of the mixing wall 322 can be rotationally aligned with the funnel flow path of the funnel 321 such that fluid flowing through and/or out of the funnel flow path is generally directed toward (and impacts) the barrier portion. The mixing wall flow path can be rotationally offset from the funnel flow path. If the mixing unit 311 includes multiple funnels 321, the mixing unit 311 can include a corresponding number of barrier portions with each barrier portion being rotationally aligned with a fluid flow path of a corresponding funnel 321. The mixing unit 311 can include a number of mixing wall flow paths that is equal to the number of barrier portions (and/or funnel flow paths).

The barrier portions and the mixing wall flow paths can be alternatingly arranged about the circumference of the mixing wall 322. In addition, the barrier portions and the mixing wall flow paths can be equidistantly arranged about the circumference of the mixing wall 322. If the shape of the mixing wall 322 is a hyperbolic paraboloid (or similar to a hyperbolic paraboloid), the barrier portion(s) of the mixing wall 322 can be located at a concave portion of the mixing wall 322 (e.g., at or near a local maximum along the circumference of the mixing wall 322), and/or the mixing wall flow path(s) of the mixing wall 322 can be located at a convex portion of the mixing wall 322 (e.g., at or near a local minimum along the circumference of the mixing wall 322). Alternatively, the barrier portion(s) of the mixing wall 322 can be located at a convex portion of the mixing wall 322 (e.g., at or near a local minimum along the circumference of the mixing wall 322), and/or the mixing wall flow path(s) of the mixing wall 322 can be located at a concave portion of the mixing wall 322 (e.g., at or near a local maximum along the circumference of the mixing wall 322).

The inline mixer 301 can include multiple mixing units 311, and the mixing units 311 can be arranged in a stacked configuration. The mixing units 311 can include multiple funnel flow paths. As an illustrative example, the mixing units 311 can include multiple funnel flow paths, such as the two funnel flow paths shown in FIG. 3. The funnel flow paths can be equidistantly positioned. For example, in the configuration of FIG. 3, in which the mixing units 311 each include two funnel flow paths, the funnel flow paths can be arranged on opposite sides of the circumference of the mixing unit 311 (i.e., approximately 180 degrees apart). The barrier portions of the mixing wall 322 of each mixing unit 311 can be rotationally aligned with corresponding fluid flow paths of the funnel 321, and the mixing wall flow paths can be rotationally offset from the fluid flow paths. The barrier portions and mixing wall flow paths can be alternatingly arranged and/or equidistantly positioned. For example, in the configuration of FIG. 3, in which the mixing units 311 each include two barrier portions and two mixing wall flow paths, the barrier portions and mixing wall flow paths can be alternatingly arranged and positioned at 90-degree intervals. That is to say, a first mixing wall flow path can be positioned 90 degrees apart from a first barrier portion along the circumference of the mixing wall 322, a second barrier portion can be positioned 90 degrees apart from the first mixing wall flow path along the circumference of the mixing wall 322, a second mixing wall flow path can be positioned 90 degrees apart from the second barrier portion along the circumference of the mixing wall 322, and the first barrier portion can be positioned 90 degrees apart from the second mixing wall flow path along the circumference of the mixing wall 322.

The various mixing units 311 of the inline mixer 301 can be stacked such that the funnel flow paths of adjacent mixing units are generally axially aligned. Alternatively or in addition, one or more mixing units 311 can be rotated relative an adjacent mixing unit such that the funnel flow paths of the adjacent mixing units 311 are rotationally offset (i.e., axially unaligned).

All mixing units 311 can include the same number of funnel flow paths and barrier portions. Alternatively, some mixing units 311 can include a different number of funnel flow paths and/or barrier portions as compared to other mixing units 311. As an illustrative example and as shown in FIG. 3, the final mixing unit 311 can include a single funnel flow path, which can be aligned with the exit tube 123. The final mixing unit 311 can include a mixing wall 322. Alternatively, the final mixing unit can omit a mixing wall 322, as shown in FIG. 3. In such an example, the various components of the inline carbonator 100 can be arranged such that the base 115 of the intake cap 101 (or another component) can function as a barrier portion.

Figure 4:
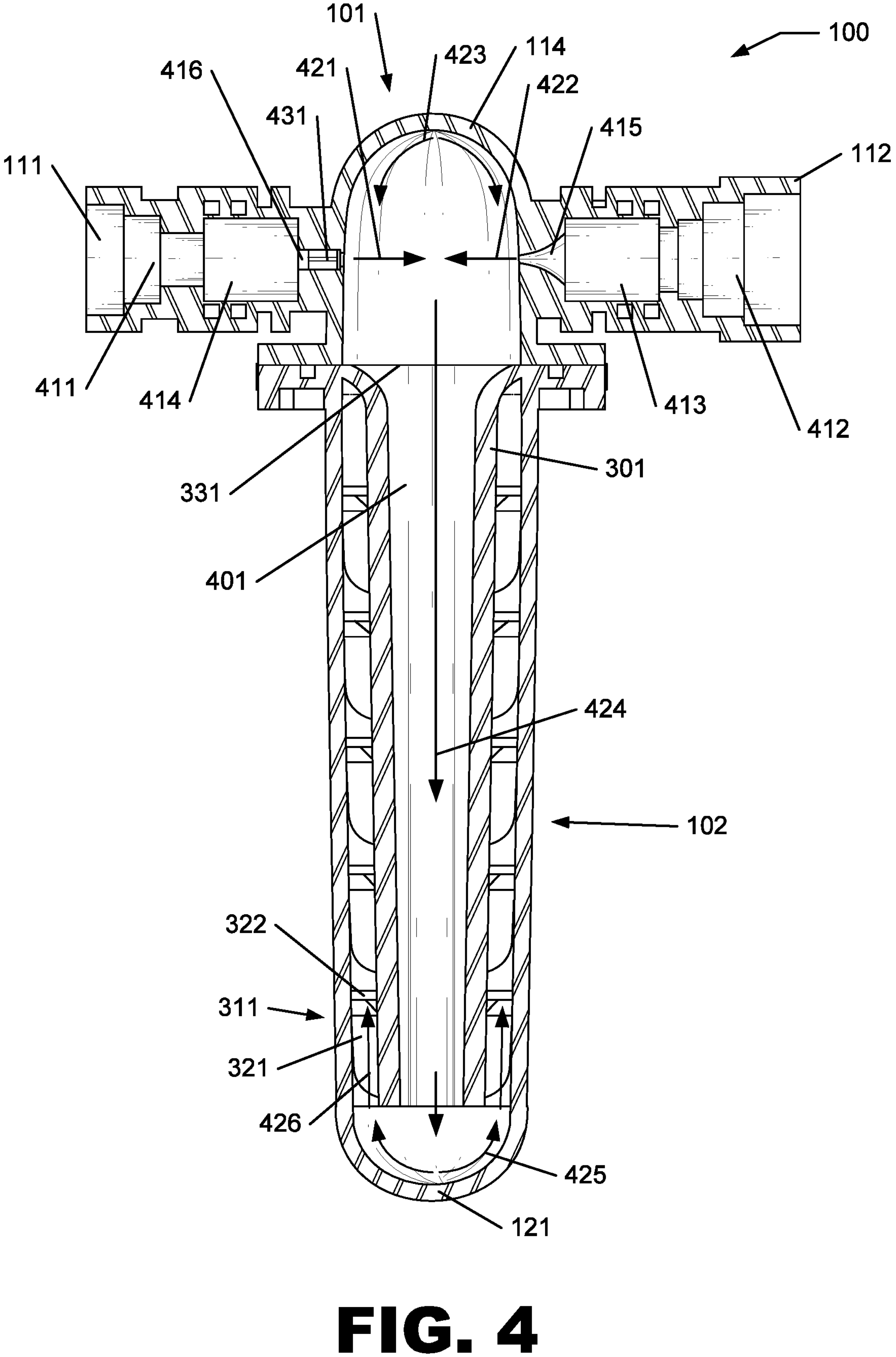
FIG. 4 illustrates a first cross-section view of the inline carbonator, in accordance with the disclosed technology.

Referring now to FIG. 4, illustrated is a first cross-section view of an inline carbonator 100. The inline mixer 301 can include a central channel 401 extending the entire length of the inline mixer 301. The central channel 401 can direct carbon dioxide and water from the intake cap 101 to the container base 121. The central channel 401 can taper similarly to the inline container 102. For example, the central channel 401 can be formed as, or have a shape substantially similar to, a conical fulcrum. In various embodiments, having a central channel 401 with a generally conical fulcrum shape can help the inline carbonator 100 to cause or promote acceleration of the carbon dioxide and water mixture as it progresses from the intake cap 101 to the container base 121.

The first intake 111 can include a first funnel 411, a first holding region 413, and a first intake funnel 415. The second intake 112 can include a second funnel 412, a second holding region 414, and a second intake tube 416. The first intake 111 and the second intake 112 can be substantially similar. Alternatively, the second intake 112 and the first intake 111 can have one or more differently sized components. The first intake 111 can have smaller or equal dimensions to the second intake 112. For example, the first funnel 411 can be equal in size to, or smaller in size than, the second funnel 412. The first funnel 411 and the second funnel 412 can include a series of reduced volume zones to taper the first funnel 411 and the second funnel 412. The series of reduced volume zones of the first funnel 411 and the second funnel 412 can increase the pressure of the water and carbon dioxide traveling through the first intake 111 and second intake 112, respectively. As the carbon dioxide and the water travel into the first holding region 413 and the second holding region 414, respectively, the pressure may reduce before transitioning into an interior volume of the intake cap 101. The carbon dioxide and water can transition into the interior volume of the intake cap 101 by moving through the first intake funnel 415 and the second intake tube 416 (also referred to herein as a first inlet and a second inlet). The first intake funnel 415 can reduce the volume of the carbon dioxide as it enters the internal volume of the intake cap 101, decreasing its pressure and increasing its velocity. The second intake tube 416 can maintain a consistent amount of pressure and volume of water transitioning into the interior volume of the intake cap 101. The second intake tube 416 may include an insert 431. The diameter of the first intake funnel 415 and the second intake tube 416 can be varied. Changing the diameter of the first intake funnel 415 and the second intake tube 416 can allow for varied amounts of carbon dioxide pressure and water pressure, respectively. The insert 431 may be inserted into the intake tube 416 to regulate the flow of water and/or carbon dioxide into the intake cap 101. In various embodiments, the insert 431 is removable to promote the flow of water and/or carbon dioxide. The insert 431 may include a reduce volume passageway to hinder the throughput of water and/or carbon dioxide into the inline carbonator 100. For example, the insert 431 may reduce the diameter of the intake tube 416 to at least approximately 0.01 inch, between approximately 0.01 inch and approximately 0.03 inch, between approximately 0.01 inch and approximately 0.017 inch, approximately 0.017 inch, between approximately 0.017 inch and approximately 0.03 inch, or less than approximately 0.03 inch. Reducing the diameter of the intake tube 416 can decrease the volume of the intake cap 101. The insert 431 can reduce the volume and surface area of the intake tube 416 to increase the carbonation capabilities of the carbon dioxide and/or water.

The inline carbonator 100 can allow for varied levels of carbonation. For example, a computing system controlling the water and carbon dioxide flow into the inline carbonator 100 can vary the amount of carbon dioxide injected into the inline carbonator 100. The computing system can rapidly pump carbon dioxide in intervals. For example, the computing system can pump carbon dioxide into the inline carbonator 100 at a rate of once every second (though any particular time interval is possible). By pumping carbon dioxide into the inline carbonator 100 at a rate of once every second, the inline carbonator 100 can slightly carbonate the water to produce a mildly carbonated liquid. The computing system can pump the carbon dioxide into the inline carbonator 100 in intervals by pulsing a pump pumping the carbon dioxide into the inline carbonator. The computing system can, for example, change a duty cycle of a 1 Hz on/off signal to control the amount of time the pump is active and pumping carbon dioxide into the inline carbonator 100. In another example, the inline carbonator 100 can include a valve that regulates the amount of carbon dioxide entering the inline carbonator 100. Continuing this example, the computing system can employ the 1 Hz signal and vary the duty cycle to control the amount of carbon dioxide entering the inline carbonator 100. Further continuing this example, a duty cycle of 25% would indicate that the valve allows carbon dioxide into the inline carbonator 100 for 0.25 second and closes the valve for 0.75 seconds.

The inline carbonator 100 can include a controller for controlling the water pressure based on the pressure of the carbon dioxide. For example, the inline carbonator 100 can include a piloted pressure regulator. The controller can control the carbonation level when the water pressure varies due to manufacturing tolerances in the pumps or other variation in the source's water pressure.

The first intake 111 can produce or facilitate a water flow 421 into the intake cap 101. The second intake 112 can produce or facilitate a carbon dioxide flow 422 into the intake cap 101. The pressure and velocity produced or facilitated by the first intake 111 and the second intake 112 can transfer into the water flow 421 and the carbon dioxide flow 422, respectively. The water flow 421 and the carbon dioxide flow 422 can combine to form a turbulent mixture. The velocity and pressure of the water flow 421 and/or the velocity and pressure of the carbon dioxide flow 422 can stimulate carbonation of the water. After combining in the middle of the intake cap 101, the carbon dioxide and water mixture can progress towards the container aperture 331 and the intake head 114. When the carbon dioxide and water mixture makes contact with the intake head 114, the hemispherical shape of the intake head 114 can help redirect the carbon dioxide and water mixture towards the container aperture 331 along an intake head flow 423.

The carbon dioxide and water mixture can progress through the central channel 401 from the intake cap 101 by passing through the container aperture 331. The carbon dioxide and water mixture can progress along a central channel flow 424. The central channel flow 424 can move from the intake cap 101 to the container base 121. The central channel flow 424 can make contact with the container base 121, which can promote greater carbonation of the water. The pressure and velocity of the central channel flow 424 can cause carbon dioxide bubble elongations when the central channel flow 424 makes contact with the container base 121. The increased surface area of the elongated carbon dioxide bubbles can promote greater carbonation of the water. The hemispherical shape of the container base 121 can promote a flow 425 in the opposite direction of the central channel flow 424. That is to say, the central channel 401 can guide a flow of fluid(s) in a first axial direction, and the flow of fluid(s) can transition to a second axial direction at or near the container base 121 (e.g., at or near an end of the inline mixer 301). The second axial direction can be approximately opposite the first axial direction. As described more fully herein, the second axial direction can extend generally in a direction extending from the container base 121 to the container aperture 331. Although the fluid(s) can temporarily deviate from the axial direction (e.g., when encountering the mixing wall(s) 322 of the inline mixer 301) when traveling along the inline mixer 301, it will be appreciated that the general direction of the flow of fluid(s) is in the axial direction at least because fluid(s) can flow from a location at or near the container base 121 to the outlet tube 123, is axially distant from the container base 121.

The constant central channel flow 424 can force the carbon dioxide and water mixture to flow towards the mixing units 311 (e.g., in the second axial direction from the container base 121). The flow 425 can transition to a mixing flow 426 as the carbon dioxide and water mixture progresses towards, and through, the mixing units 311 of the inline mixer 301. The mixing flow 426 can extend from the base of the first mixing unit 311 to the exit of the last mixing unit 311 nearest the intake cap 101.

In a given mixing unit 311, the mixing flow 426 can progress through the funnel 321. The mixing flow 426 can make contact with the mixing wall 322, which can promote bubble elongation of the carbon dioxide and carbonation of the water. The mixing flow 426 can progress through a series of mixing units 311 and exit the inline carbonator 100 (e.g., via the exit tube 123) as carbonated water.

Figure 5:
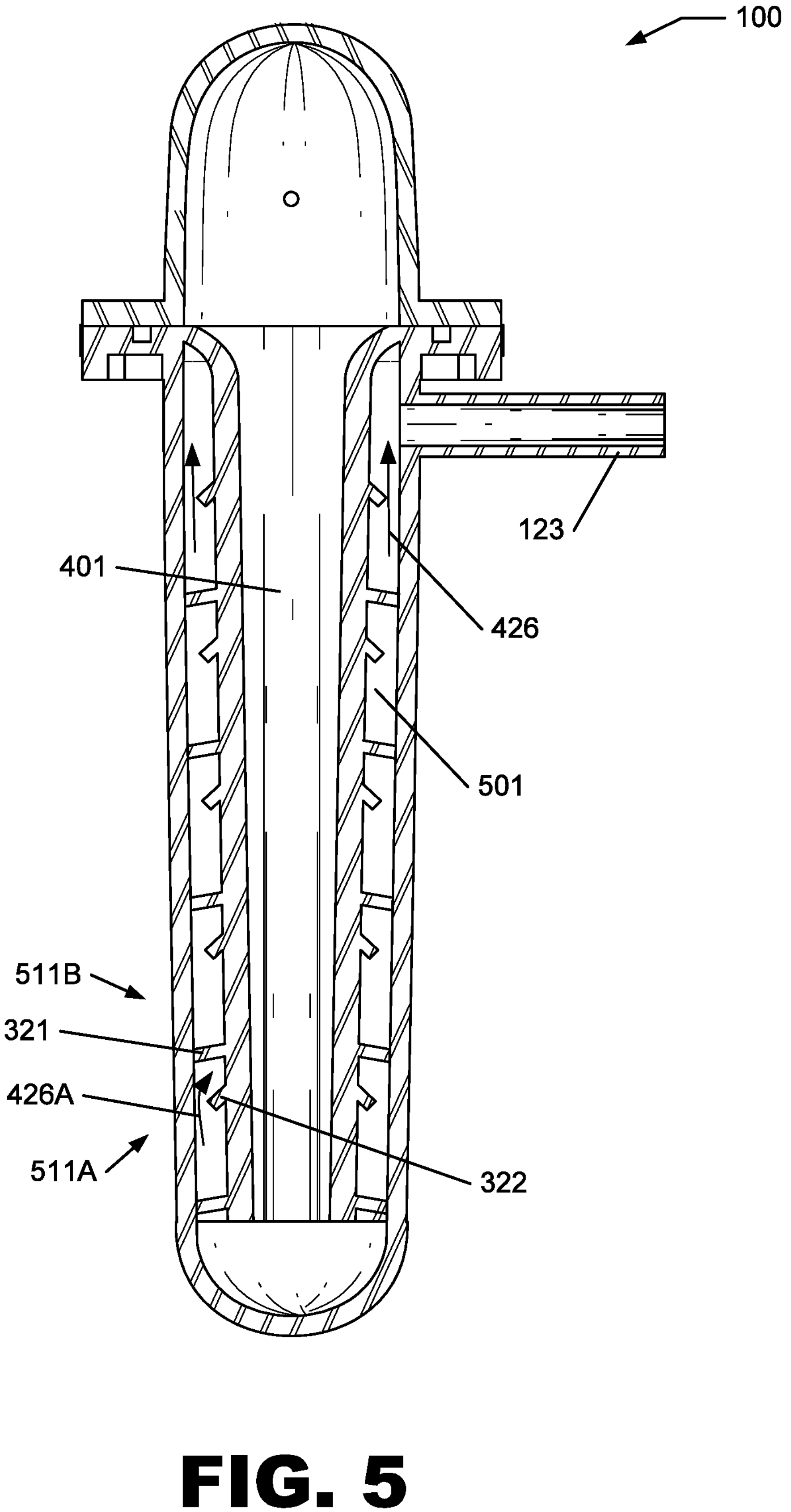
FIG. 5 illustrates a second cross-section view of the inline carbonator, in accordance with the disclosed technology.

Referring now to FIG. 5, illustrated is a second cross-section view of the inline carbonator 100 that is taken along a longitudinal cross-sectional plane that is rotated 90 degrees relative the cross-sectional plane corresponding to FIG. 4, according to one example of the present disclosure. In particular, FIG. 5 illustrates the mixing wall flow paths 501 of various mixing units 311 of the inline carbonator 100. The mixing wall flow path 501 can indicate a region in which fluid can pass from a first mixing unit 511A to a second mixing unit 511B. The wall flow path 501 can extend around the central channel 401. The first mixing unit 511A and the second mixing unit 511B can be the same or substantially similar to the mixing units 311 described herein. For the purpose of explanation, the discussion is limited to the first mixing unit 511A and the second mixing unit 511B, although the discussion can be applied to any adjacent set of mixing units 311. The mixing flow 426 can include a curved flow 426A. The curved flow 426A can illustrate the direction of the mixing flow 426 as it transitions from the first mixing unit 511A to the second mixing unit 511B. The curved flow 426A can progress past the mixing wall 322 of the first mixing unit 511A. As the curved flow 426A progresses past the mixing wall 322 of the first mixing unit 511A, the funnel 321 of the mixing unit 511B can redirect the curved flow 426A into a path towards the mixing wall 322 of the second mixing unit 511B. This process can be repeated until the fluid reaches the exit tube 123. Upon reaching the exit tube 123, the carbonated water solution can be outputted to any particular location.

Figure 6A:
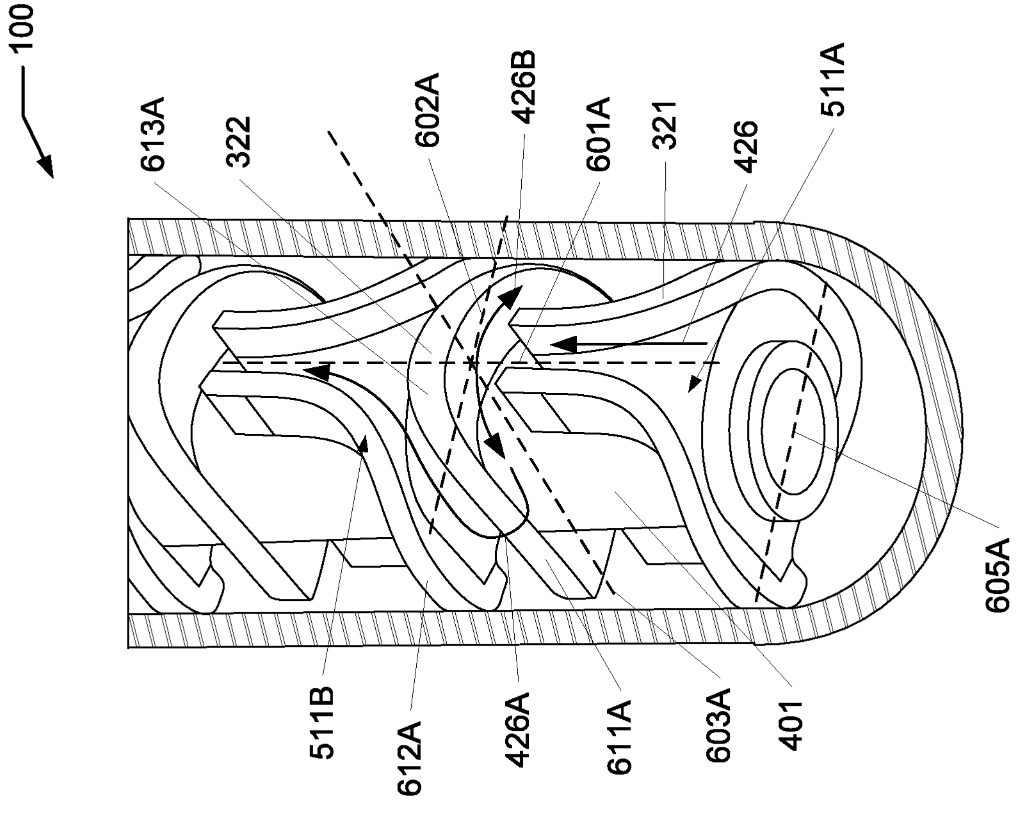
FIG. 6A illustrates a partial cross section view of an inline container with an inserted inline mixer, in accordance with the disclosed technology.

Referring now to FIG. 6A, illustrated is a partial cross-sectional view of the inline container 102 with an inserted inline mixer 301, according to one example of the present disclosure. The inline mixer 301 can promote movement of the carbon dioxide and water on a first axis 601A, a second axis 602A, and a third axis 603A.

The process of moving the carbon dioxide and water mixture through the inline mixer 301 can begin with the mixing flow 426. The carbon dioxide and water mixture can follow the mixing flow 426 through the funnel 321 of the first mixing unit 511A along the first axis 601A. The funnel 321 can reduce in width (e.g., can taper) to accelerate the carbon dioxide and water mixture therethrough. The carbon dioxide and water mixture can exit the funnel 321 toward the mixing wall 322. The mixing flow 426 can make contact with the mixing wall 322 and form a turbulent flow of carbon dioxide and water. When the carbon dioxide and water mixture makes contact with the mixing wall 322, the mixing wall 322 can generate localized shear stress that can elongate existing carbon dioxide bubbles in the carbon dioxide and water mixture. The elongation of existing carbon dioxide bubble can increase the surface area of each carbon dioxide bubble. The water carbonation process can be enhanced as the surface area of the carbon dioxide bubbles increase. For example, with a greater surface are of the carbon dioxide bubbles, the water can increase its absorption of carbon dioxide.

Once the carbon dioxide and water mixture makes contact with the mixing wall 322, the carbon dioxide and water mixture are distributed along a mixing wall flow 426B. The mixing wall flow 426B can extend across the second axis 602A. In various embodiments, distributing the carbon dioxide and water mixture across the first axis 601A and the second axis 602A can increase the flow paths and time in which the carbon dioxide and water mixture are interacting. By increasing the time and paths in which the carbon dioxide and water mixture are interacting, the water can increase its chances of interacting with carbon dioxide and carbonating.

The mixing wall flow 426B can extend around the circumference of the central channel 401. The mixing wall flow 426B can transition into the curved flow 426A as it passes over the mixing wall 322 into the second mixing unit 511B. As the mixing wall flow 426B transitions to the curved flow 426A, the mixing wall flow 426 travels along the third axis 603A. The mixing wall 322 can include a recessed portion 611A. The recessed portion 611A can demarcate the outer edge of the mixing wall 322. In some embodiments, the recessed portion 611A does not make contact with the inline container 102. The gap between the inline container 102 and the recessed portion 611A can allow the curved flow 426A to transition from the first mixing unit 511A to the second mixing unit 511B. The mixing wall 322 can have an oblong shape. For example, the recessed portion 611A can be replicated on a side opposite that of the recessed portion 611A. Continuing this example, an extended mixing wall 613A can fully extend from the central channel 401 to the inline container 102. The extended mixing wall 613A can force the carbon dioxide and water mixture to flow in the direction of the curved flow 426A.

The process of carbonating the water by moving the carbon dioxide and water mixture through the first and second mixing units 511A and 511B can be repeated until reaching the end of the inline mixer 301. The substance nearest to the exit tube 123 (not pictured) can be considered carbonated water. The inline carbonator 100 can be symmetrical about a plane 605A. The plane 605A can split the inline mixer into two identical sets of adjacent mixing units 311. In various embodiments, allowing the carbon dioxide and water mixture to travel along the first axis 601A, the second axis 602A, and the third axis 603A, maximizes the total time the carbon dioxide and water mixture is interacting. For example, the greater the length traveled by the carbon dioxide and water mixture, the more time the carbon dioxide and water mixture can mix together to from carbonated water.

Figure 6B:
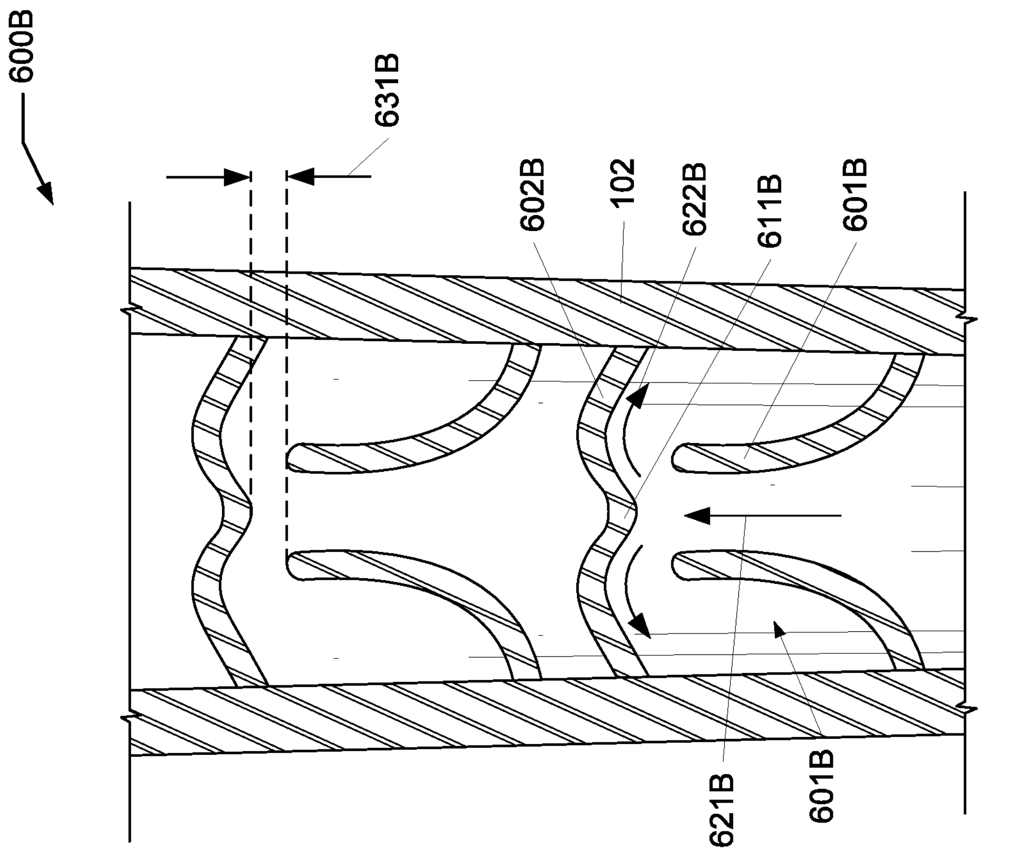
FIG. 6B illustrates a cross-section of the inline mixer and the inline container, in accordance with the disclosed technology.

Referring now to FIG. 6B, illustrated is a cross section view of the inline container 102 and an inline mixer 600B, according to one example of the present disclosure. In some embodiments, the second inline mixer 600B is substantially similar to the inline mixer 301 but with a dissimilarly shaped mixing wall. The second inline mixer 600B can include a mixing unit 601B a funnel 602B and a mixing wall 603B. The funnel 602B can direct a mixing flow 621B towards the mixing wall 603B. The mixing wall 603B can include a widow's peak 611B (e.g., a substantially V-shaped descending extension). The widow's peak 611B can stimulate greater carbonation of the water by elongating carbon dioxide bubbles. The pressure of the mixing flow 621B can create a lateral flow 622B. The lateral flow 622B can transition the carbon dioxide and water mixture towards the recessed portion of the mixing wall 603B (not pictured). The funnel 602B can extend fully along the surface of the container wall 122. The mixing wall 603B can extend along the surface of the inline container 102 at specific locations. For example, the mixing wall 603B can extend towards the inline container 102 at a location above the funnel 602B. At the recessed portion, the mixing wall 603B does not extend to the inline container 102 to facilitate carbon dioxide and water movement into the adjacent mixing unit 601B.

In some embodiments, a height 631B can measure the distance between the mixing wall 603B and the funnel 602B. The height 631B can be more than approximately 0.1 mm, between approximately 0.1 and approximately 100.0 mm, between approximately 0.1 and approximately 10.0 mm, between approximately 10.0 and approximately 50.0 mm, between approximately 50.0 and approximately 100.0 mm, or less than approximately 100.0 mm. The inline mixer 301 can have a uniform shape. For example, each of the one or more mixing units 311 may be substantially similar in size, dimension, and construction throughout the entire inline mixer 301. The inline mixer 301 can have a variable shape or size. For example, the one or more mixing units 311 may have varying sizes, varying dimensions, and/or varying constructions throughout the entire inline mixer 301. As a more specific, non-limiting example, a first mixing unit 311 can have first dimensions (or a component thereof can have a first size or dimension), and a second mixing unit 311 can have second dimensions that is different from the first dimensions (or a component thereof can have a second size or dimension that is different from the first size or dimension).

Figure 6C:
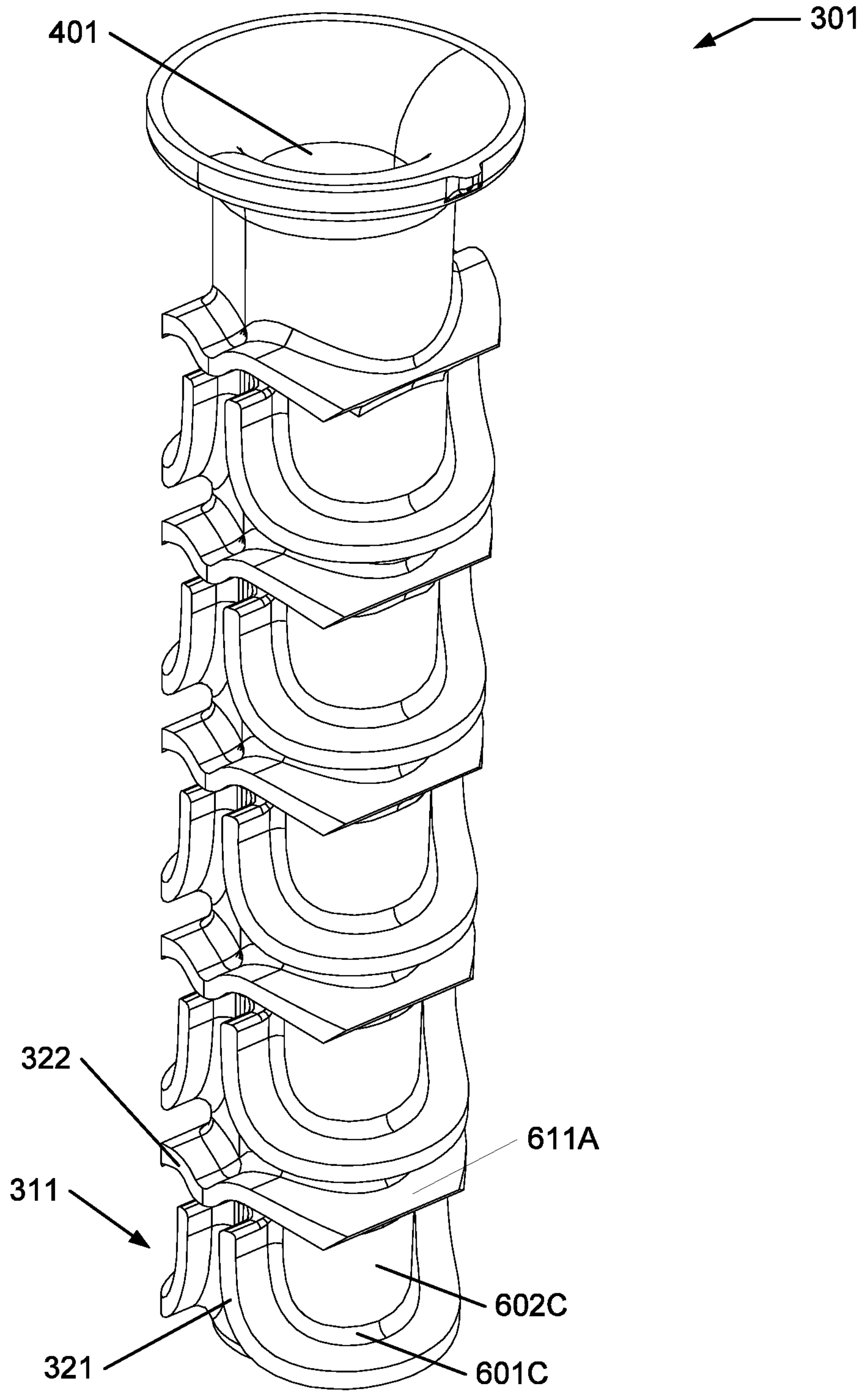
FIG. 6C illustrates a first perspective view of the inline mixer, in accordance with the disclosed technology.

Referring now to FIG. 6C, illustrated is a first perspective view of the inline mixer 301, according to one example of the present disclosure. The inline mixer 301 can separate from the inline container 102. For example, the inline mixer 301 can be removable from the inline container 102 for cleaning and replacement. The inline mixer can include one or more mixing units 311. The inline mixer 301 can include a curved edge 601C. The curved edge 601C can facilitate a smooth and/or continuous transition between an exterior surface 602C of the central channel 401 and the funnel 321. The curved edge 601C can apply to any transition between the exterior surface 602C and the mixing units 311.

Figure 6D:
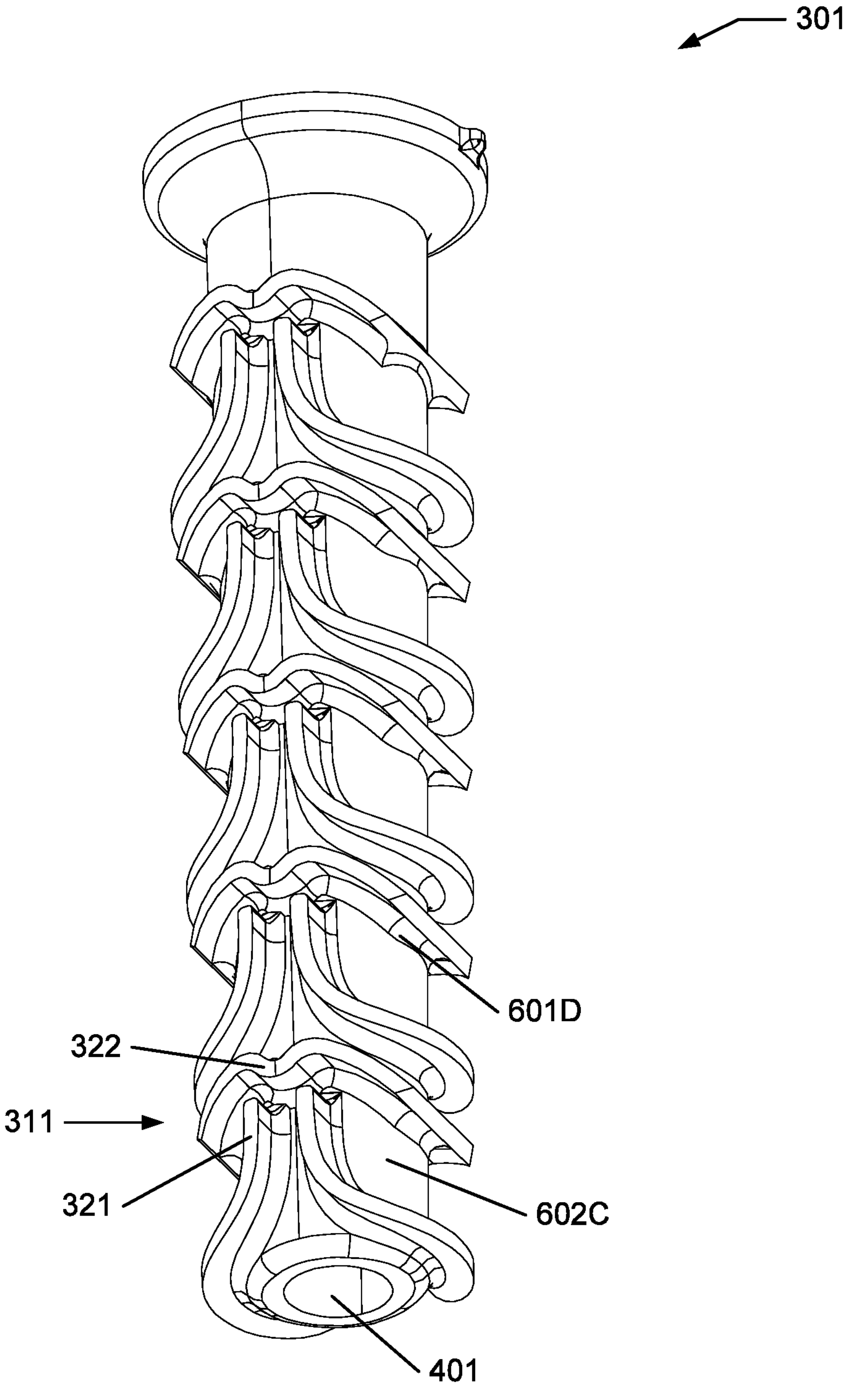
FIG. 6D illustrates a second perspective view of the inline mixer, in accordance with the disclosed technology.

Referring now to FIG. 6D, illustrated is a second perspective view of the inline mixer 301, according to one example of the present disclosure. The water and carbon dioxide mixture can pass through the central channel 401 and enter into the mixing unit 311. The inline mixer 301 can include a second curved edge 601D. The second curved edge 601D can be substantially similar to the curved edge 601C. The second curved edge 601D can demarcate a transition from the exterior surface 602C of the central channel 401 to the underside of the mixing wall 322. Any particular transition between the mixing unit 311 and the exterior surface 602C can include a curved edged.

Figure 7:
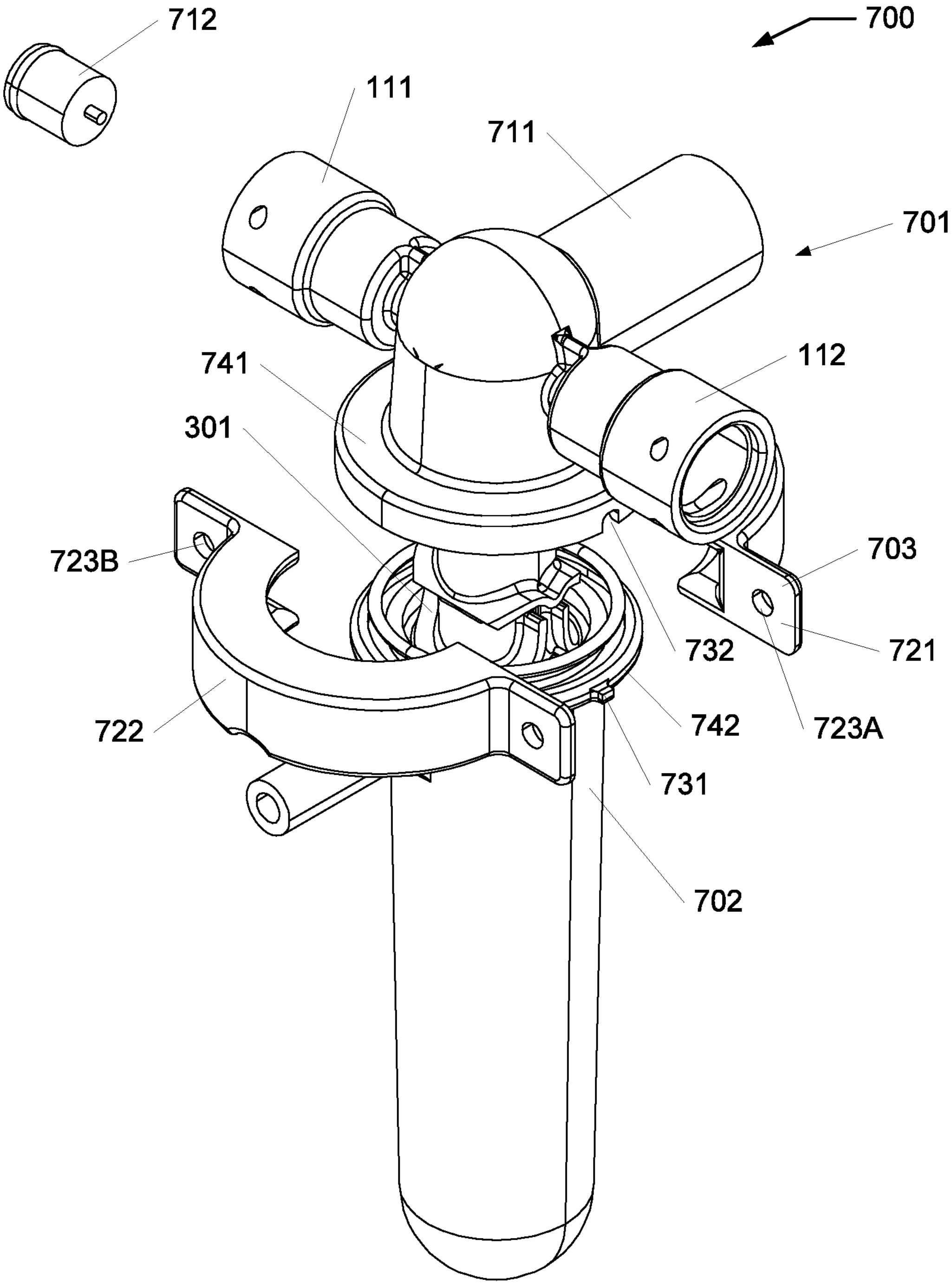
FIG. 7 illustrates a perspective view of a second inline carbonator, in accordance with the disclosed technology.

Referring now to FIG. 7, illustrated is a perspective view of a second inline carbonator 700, according to one example of the present disclosure. The second inline carbonator 700 can be substantially similar to the inline carbonator 100 with various modifications. The second inline carbonator 700 may include similar functionalities to the inline carbonator 100. For example, the inline carbonator 700 can facilitate carbonating water and/or any other particular substance. The second inline carbonator 700 may include an intake cap 701, inline container 702, and a clamp system 703.

The intake cap 701 may facilitate moving carbon dioxide and water into the second inline carbonator 700. The intake cap 701 may be substantially similar to the intake cap 101. The intake cap 701 may include the first intake 111, the second intake 112, and a pressure relief valve 711. The pressure relief valve 711 may function as a pathway for releasing excess pressure built up in the second inline carbonator 700. For example, after use, the second inline carbonator 700 may depressurize through the pressure relief valve 711. The pressure relief valve 711 can facilitate depressurizing the inline carbonator 700 if the pressure is too high. For example, the pressure relief valve 711 can depressurize the inline carbonator 100 if the pressure within the inline carbonator 100 has surpassed a pressure threshold.

The intake cap 701 may include a check valve 712. The check valve 712 can insert into the first intake 111 and/or the second intake 112 to regulate the throughput of substances traveling into the second inline carbonator 700. The check valve 712 can keep water and carbon dioxide from flowing back into the first intake 111 and the second intake 112 from within the inline carbonator 100.

Once water and/or carbon dioxide has entered the inline carbonator 100, the inline container 702 may direct the flow of carbon dioxide and water in and around the inline mixer 301. The inline container 702 may be substantially similar to the inline container 102.

The clamp system 703 may function as an appending system for attaching the inline container 702 to the intake cap 701 and/or for securing the inline mixer 301 in place relative the inline container 702 and/or the intake cap 701. The clamp system 703 may include a first clamp portion 721 and a clamp portion 722. The clamp portion 721 can be substantially similar to the clamp portion 722. The clamp system 703 can encase a cap neck 741 and a container neck 742. The clamp portion 721 and the clamp portion 722 may encase the cap neck 741 and the container neck 742 by appending together through the appendage apertures 723A, 723B. The appendage apertures can receive a screw, bolt, nail, pin, rivet, and/or any particular appending apparatus to fix the clamp portion 722 and the clamp portion 721 together around the cap neck 741 and the container neck 742. The cap neck 741 and the container neck 742 can interlock by inserting a locking protrusion 731 into a locking receptacle 732. The clamp system 703 may be removable such that a user can access the internal components of the second inline carbonator 700.

Figure 8:
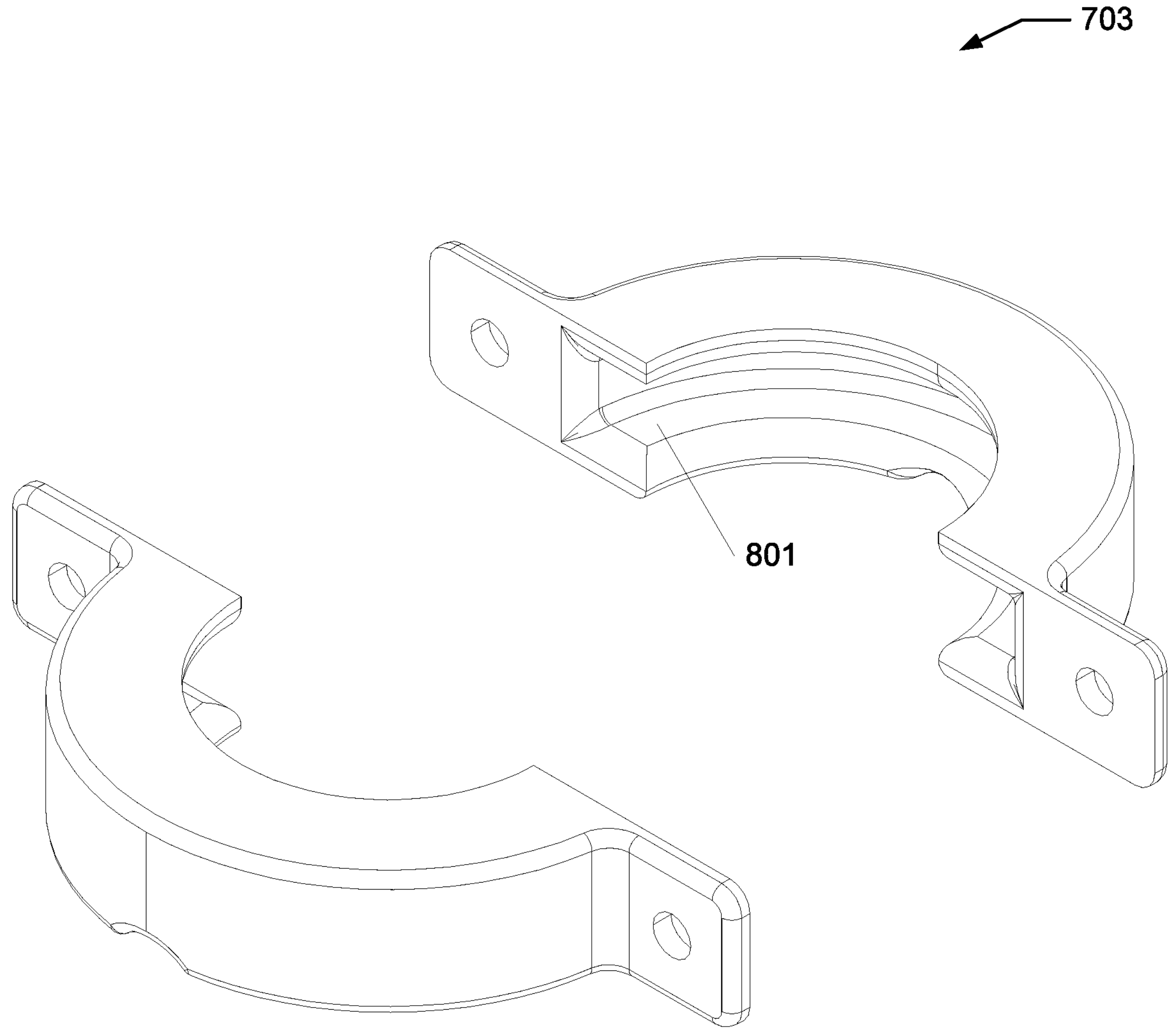
FIG. 8 illustrates a perspective view of the clamp system, in accordance with the disclosed technology.

Referring now to FIG. 8, illustrated is a perspective view of the clamp system 703, according to one example of the present disclosure. The clamp portion 721 and the clamp portion 722 can include a recess 801. The recess 801 may match the exterior contours of the cap neck 741 and/or the container neck 742. By matching the contours of the cap neck 741 and/or the container neck 742, the cap neck 741 and/or the container neck 742 may fit within the clamp system 703 when locked.

Figure 9:
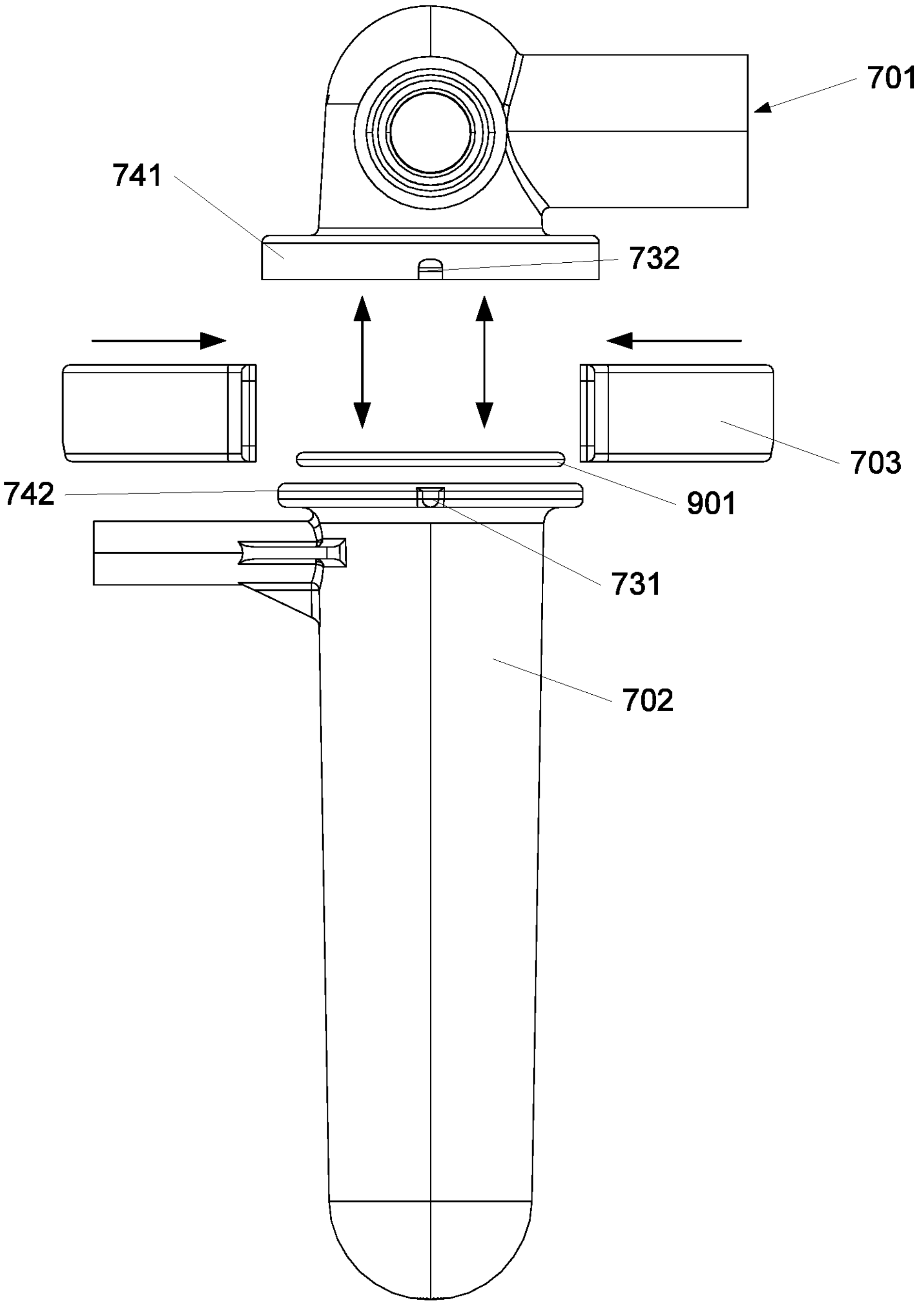
FIG. 9 illustrates a side view of various components of the second inline carbonator, in accordance with the disclosed technology.

Referring now to FIG. 9, illustrated is a side view of various components of the second inline carbonator 700, according to one example of the present disclosure. The intake cap 701 may receive the inline container 702. The cap neck 741 may have a greater diameter than the container neck 742. The container neck 742 may fit within the cap neck 741. For example, the container neck 742 can lock into place relative to the cap neck 741 by inserting the locking protrusion 731 into the locking receptacle 732. The locking protrusion 731 can be fixed within the locking receptacle such that the inline container 702 does not rotate relative to the intake cap 701. The inline container 702 may include a sealing portion 901 for helping to provide a liquid-tight and/or fluid-tight connection between the intake cap 701 and the inline container 702. For example, the sealing portion 901 can be or include a gasket or O-ring that is compressible between the inline container 702 and the intake cap 701 to create a liquid-tight and/or fluid-tight seal when the clamp system 703 is engaged and the second inline carbonator 700 is assembled. The sealing portion 901 can include but is not limited to a gasket, an O-ring, one or more epoxy materials, one or more polymer materials, and/or any other material for sealing the second inline carbonator 700. Once the cap neck 741 receives the container neck 742, the clamp system 703 may envelop the cap neck 741 and the container neck 742. The clamp system 703 can lock together such that the inline container 702 cannot disconnect from the intake cap 701.

Figure 10:
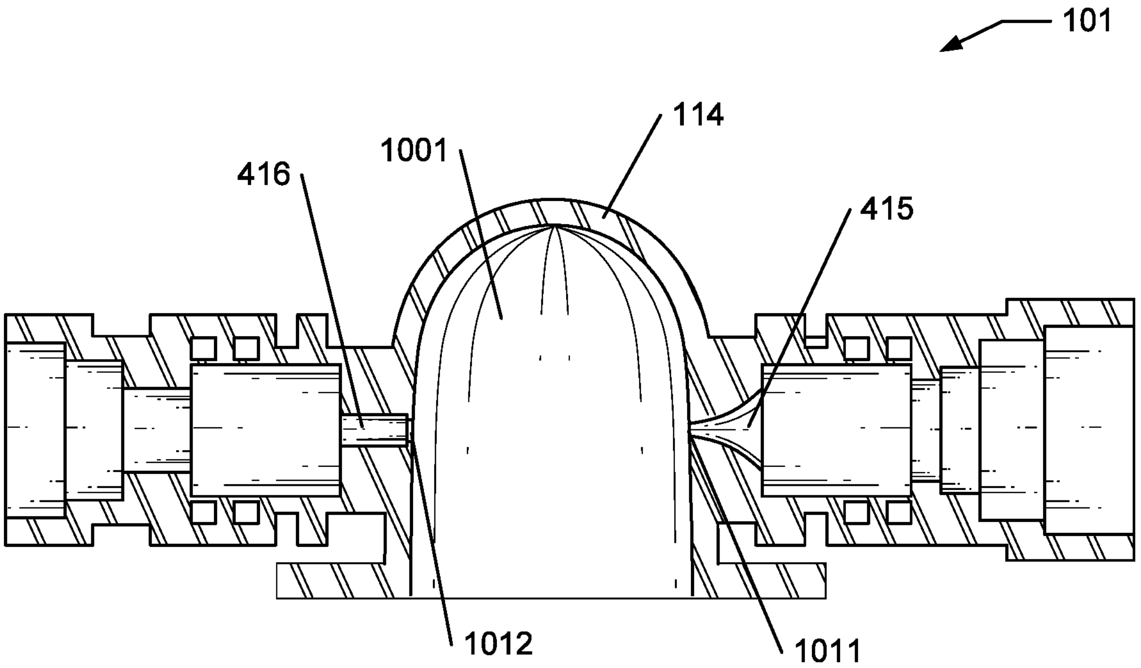
FIG. 10 illustrates a cross-section view of an intake cap, in accordance with the disclosed technology.

Referring now to FIG. 10, illustrated is a cross-section view of the intake cap 101, according to one example of the disclosed technology. The intake cap 101 can function as an initial location to receive carbon dioxide and water for subsequent mixing (e.g., mixing can also refer to the creation of carbonated water from the components of carbon dioxide and water). The intake head 114 can include an intake mixing chamber 1001. The first intake funnel 415 and the second intake tube 416 can connect to the intake mixing chamber 1001. The first intake funnel 415 and the second intake tube 416 can inject water and carbon dioxide, respectively, into the intake mixing chamber 1001. The intake mixing chamber 1001 can receive the water through a first aperture 1011. The intake mixing chamber 1001 can receive the carbon dioxide through a second aperture 1012. For example, the intake mixing chamber 1001 can receive water through the first intake funnel 415. The source pressure of the water and carbon dioxide provided by the source can force the water and carbon dioxide through the first aperture 1011 and second aperture 1012, respectively. Continuing this example, the intake mixing chamber 1001 can receive carbon dioxide through the second intake tube 416. The water can progress through the first intake funnel 415 and pass through a first aperture 1011 into the intake mixing chamber 1001. The carbon dioxide can progress through the second intake tube 416 and through the second aperture 1012 into the intake mixing chamber 1001. Once introduced into the mixing chamber 1001, the water and carbon dioxide can commence the mixing process.

Factors that can affect water carbonation can include, but are not limited to, water temperature, the pressure of the intake mixing chamber 1001, the intensity of mixing, and a flow ratio between the carbon dioxide and the water. In one example, an optimal water temperature for carbonating water can include a water temperature measuring at most 40 degrees Fahrenheit. In another example, an optimal pressure within the intake mixing chamber 1001 for carbonating water can include a pressure (e.g., source pressure) of at least 60 pounds per square inch (PSI). The flow ratio between the carbon dioxide and the water can measure a ratio of the amount of carbon dioxide input into the intake cap 101 as compared to the amount of water input into the intake cap 101. In another example, an optimal flow ratio for maximizing water carbonation can measure at least 3.7.

Continuing this example, the optimal flow rate of 3.7 can indicate that for every unit of water input into the intake cap 101, 3.7 units of carbon dioxide are input into the intake cap 101.

The inline carbonator 100 can include one or more constraints. The one or more constraints can define particular aspect of the inline carbonator 100 that govern the factors that affect water carbonation. The constraints can include but are not limited to a pump pressure, a carbon dioxide pressure, a water pressure, and a downstream pressure drop. The downstream pressure drop can correspond to a measurement of the change in pressure between the intake cap 101 and the exit tube 123. For example, the downstream pressure drop can measure at least 60 PSI for a flow rate of 2 liters per minute (LPM).

Based on the constraints, the inline carbonator 100 can include various design variables to optimize the factors that affect water carbonation. For example, the various design variables can include modifications that affect the constraints of the inline carbonator and therefore influence the factors that affect water carbonation. The design variables can include but are not limited to regulating the water pressure, regulating the carbon dioxide pressure, changing the first aperture 1011 diameter, changing the second aperture 1012 diameter, and decreasing the pressure drop between the valve and the nozzle. For example, the design variables can be adjusted by actions performed by the inline carbonator 100 to optimize the factors that affect water carbonation. In another example, the design variables can be adjusted in the properties of the inline carbonator 100 during the manufacturing process (e.g., setting the first aperture 1011 diameter).

For the purpose of example and explanation of the various design variables can be adjusted through manufacturing parameters in the inline carbonator 100 or through adjustments in the intake parameters of the system (e.g., the water and carbon dioxide). In one example scenario, a flow ratio of at least 3.8, 3.8 to 4.5, 3.8 to 4.2, 4.2 to 4.5, or less than 4.5 can be used. The flow ratio can illustrate, for example, for every 3.8 liters of carbon dioxide injected into the intake cap 101, the intake cap 101 receives one liter of water. At a water temperature of 40 degrees Fahrenheit or less, the flow ratio of 3.8 to 4.5 can produce a water carbonation level of 3.3 to 3.8. To achieve a flow ratio of 3.8 to 4.5, the inline carbonator 100 can include a change in the first aperture 1011 diameter and the second aperture 1012 diameter and/or a change in the water pressure and the carbon dioxide pressure.

Changing the first aperture 1011 diameter and the second aperture 1012 diameter can change the water pressure and carbon dioxide pressures, respectively. By changing the water pressure and carbon dioxide pressure, the inline carbonator 100 can adapt to generate adequate conditions for optimizing the various factors that affect water carbonation. For example, the first aperture 1011 and the second aperture 1012 can be manufactured to specific diameters to accommodate for varying water and carbon dioxide pressures input into the intake cap 101. In another example, where the first aperture 1011 diameter and the second aperture 1012 diameter are fixed, the inline carbonator 100 can vary the water pressure and carbon dioxide pressure into the intake cap 101 to optimize a particular combination of water and carbon dioxide. Continuing this example, varying the water pressure and carbon dioxide pressure can also account for the different diameters of the first aperture 1011 and the second aperture 1012. In yet another example, the inline carbonator 100 can be optimized to operate with equal carbon dioxide pressure and water pressure, where the carbon dioxide pressure and the water pressure measure at least about 60 PSI, 60 to 110 PSI, 60 to 80 PSI, 80 to 110 PSI, or less than 110 PSI. In some embodiments, a set of intake caps 101 can be manufactured with each intake cap 101 including a different diameter of the first aperture 1011 and/or the second aperture 1012. During installation, a particular intake cap 101 can be selected from the set of intake caps 101 that corresponds to particular combination of water pressure and/or carbon dioxide pressure.

The foregoing description of the exemplary embodiments has been presented only for the purposes of illustration and description and is not intended to be exhaustive or to limit the inventions to the precise forms disclosed. Many modifications and variations are possible in light of the above teaching.

Clause 1. An inline carbonator comprising: a body comprising a first inlet and a second inlet, the first inlet being configured to receive a first fluid and the second inlet being configured to receive a second fluid; an inline mixer disposed within the body, the inline mixer comprising: a central channel defining an inner flow path configured to transport a combination of the first and second fluids along the inline mixer in a first direction, the central channel being in fluid communication with the first inlet and the second inlet; and a mixing unit defining an outer flow path that is in fluid communication with the inner flow path, the outer flow path being configured to transport the combination of the first and second fluids along the inline mixer in a second direction that is generally opposite the first direction.

Clause 2. The inline carbonator of clause 1 or any other clause herein, wherein the mixing unit comprises: a funnel structure; and a mixing wall structure.

Clause 3. The inline carbonator of clause 2 or any other clause herein, wherein the mixing wall structure comprises a mixing wall flow path defined at least in part by a gap between an outer edge of the mixing wall structure and an interior surface of the body of the inline carbonator.

Clause 4. The inline carbonator of clause 2 or any other clause herein, wherein the mixing wall structure comprises a mixing wall flow path defined by an aperture extending through the mixing wall structure.

Clause 5. The inline carbonator of clause 2 or any other clause herein, wherein the mixing wall structure has an approximately hyperbolic paraboloid shape.

Clause 6. The inline carbonator of clause 5 or any other clause herein, wherein the mixing wall structure comprises a barrier portion rotationally aligned with a funnel flow path of the funnel structure, the barrier portion including at least some of a convex portion of the approximately hyperbolic paraboloid shape, the convex portion being defined relative the second direction.

Clause 7. The inline carbonator of clause 2 or any other clause herein, wherein the mixing unit comprises: a funnel structure having two or more funnel flow paths; and a mixing wall structure having two or more barrier portions, each barrier portion being rotationally aligned with a corresponding one of the two or more funnel flow paths.

Clause 8. The inline carbonator of clause 7 or any other clause herein, wherein the two or more funnel flow paths are positioned equidistantly along a perimeter of the mixing unit.

Clause 9. The inline carbonator of clause 7 or any other clause herein, wherein the mixing wall structure further comprises a mixing wall flow path configured to permit the first and second fluids to flow therethrough to pass the mixing wall structure.

Clause 10. The inline carbonator of clause 9 or any other clause herein, wherein: the mixing unit comprises two or more mixing wall flow paths, and the two or more barrier portions and the two or more mixing wall flow paths are alternatingly arranged.

Clause 11. The inline carbonator of clause 10 or any other clause herein, wherein the two or more barrier portions and the two or more mixing wall flow paths are positioned equidistantly along a perimeter of the mixing unit.

Clause 12. The inline carbonator of clause 2 or any other clause herein, wherein the body comprises: a cap; and an inline container, the cap being detachably attachable to the inline container.

Clause 13. The inline carbonator of clause 12 or any other clause herein, wherein the inline container includes a plurality of locking pins and the cap includes a plurality of locking notches, each of the plurality of locking notches being configured to at least partially receive a corresponding one of the plurality of locking pins.

Clause 14. A beverage system comprising: a water source; a carbon dioxide source; and an inline carbonator comprising: a body comprising: a water inlet configured to receive water from the water source; a carbon dioxide inlet configured to receive carbon dioxide from the carbon dioxide source; and an outlet configured to discharge a carbonated water solution; and an inline mixer disposed within the body, the inline mixer comprising: a plurality of mixing units arranged in a stacked configuration and configured to combine the water and the carbon dioxide into the carbonated water solution, each of the plurality of mixing units comprising: a funnel structure; and a mixing wall structure comprising: a barrier portion that is rotationally aligned with a funnel flow path associated with the funnel structure of the corresponding mixing unit of the plurality of mixing units.

Clause 15. The beverage system of clause 14 or any other clause herein, wherein: the inline mixer further comprises: a central channel in fluid communication with the water inlet and the carbon dioxide inlet, the central channel defining an inner flow path configured to transport the water and the carbon dioxide along the inline mixer in a first direction; and the plurality of mixing units define an outer flow path that is in fluid communication with the inner flow path, the outer flow path being configured to transport and combine the water and the carbon dioxide along the inline mixer in a second direction that is generally opposite the first direction.

Clause 16. The beverage system of clause 14 or any other clause herein, wherein the plurality of mixing units are positioned such that a funnel flow path of each of the plurality of mixing units is rotationally aligned with a funnel flow path of an adjacent one of the plurality of mixing units.

Clause 17. The beverage system of clause 14 or any other clause herein, wherein the plurality of mixing units are positioned such that a funnel flow path of each of the plurality of mixing units is rotationally offset relative with a funnel flow path of an adjacent one of the plurality of mixing units.

Clause 18. The beverage system of clause 14 or any other clause herein, wherein: the barrier portion is a first barrier portion, and for each of the plurality of mixing units: the funnel structure includes a first funnel flow path and a second funnel flow path; the mixing wall structure further comprises: a second barrier portion; a first mixing wall flow path; and a second mixing wall flow path.

Clause 19. A method for carbonating water, the method comprising: receiving water from a water supply at a first inlet of an inline carbonator; receiving carbon dioxide from a carbon dioxide supply at a second inlet of an inline carbonator; combining a flow of the water and a flow of the carbon dioxide within the inline carbonator to form a combined fluid flow; and sequentially directing the combined fluid flow: through a central channel of the inline carbonator, the combined fluid flow flowing through the central channel in a first general direction; and through an outer flow path of the inline carbonator, the outer flow path being (i) located radially outward from the central channel and (ii) comprising a funnel defining a funnel flow path and a mixing wall comprising a barrier portion and a mixing wall flow path, the combined fluid flow flowing through the outer flow path in a second general direction opposite the first general direction.

Clause 20. The method of clause 19 or any other clause herein, wherein directing the combined fluid flow through the outer flow path of the inline carbonator causes the combined fluid flow to: flow through the funnel in the second general direction via the funnel flow path; exit the funnel and impact the barrier portion of the mixing wall; flow along the barrier portion in a direction at least partially perpendicular to the second general direction; and flow through the mixing wall flow path at least partially in the second general direction to pass the mixing wall.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. An inline carbonator comprising:

a body comprising a first inlet and a second inlet, the first inlet being configured to receive a first fluid and the second inlet being configured to receive a second fluid;

an inline mixer disposed within the body, the inline mixer comprising:

a central channel defining an inner flow path configured to transport a combination of the first and second fluids along the inline mixer in a first direction, the central channel being in fluid communication with the first inlet and the second inlet; and a mixing unit comprising a plurality of funnel structures and a plurality of mixing wall structures and defining an outer flow path surrounding the inner flow path and configured to receive the combination of the first and second fluids from the inner flow path, the outer flow path being configured to transport the combination of the first and second fluids along the inline mixer in a second direction that is generally opposite the first direction.

2. The inline carbonator of claim 1, wherein at least one of the plurality of mixing wall structures comprises a mixing wall flow path defined at least in part by a gap between an outer edge of the mixing wall structure and an interior surface of the body of the inline carbonator.

3. The inline carbonator of claim 1, wherein at least one of the plurality of mixing wall structures comprises a mixing wall flow path defined by an aperture extending through the mixing wall structure.

4. The inline carbonator of claim 1, wherein at least one of the plurality of mixing wall structures has an approximately hyperbolic paraboloid shape.

5. The inline carbonator of claim 4, wherein at least one of the plurality of mixing wall structures comprises a barrier portion rotationally aligned with a funnel flow path of the funnel structure, the barrier portion including at least some of a convex portion of the approximately hyperbolic paraboloid shape, the convex portion being defined relative the second direction.

6. The inline carbonator of claim 1, wherein the at least one of the plurality of mixing wall structures comprises:

a funnel structure having two or more funnel flow paths; and a mixing wall structure having two or more barrier portions, each barrier portion being rotationally aligned with a corresponding one of the two or more funnel flow paths.

7. The inline carbonator of claim 6, wherein the two or more funnel flow paths are positioned equidistantly along a perimeter of the mixing unit.

8. The inline carbonator of claim 6, wherein at least one of the plurality of mixing wall structures further comprises a mixing wall flow path configured to permit the first and second fluids to flow therethrough to pass the mixing wall structure.

9. The inline carbonator of claim 8, wherein:

at least one of the plurality of mixing wall structures comprises two or more mixing wall flow paths, and the two or more barrier portions and the two or more mixing wall flow paths are alternatingly arranged.

10. The inline carbonator of claim 9, wherein the two or more barrier portions and the two or more mixing wall flow paths are positioned equidistantly along a perimeter of at least one of the plurality of mixing wall structures.

11. The inline carbonator of claim 1, wherein the body comprises:

a cap; and an inline container, the cap being detachably attachable to the inline container.

12. The inline carbonator of claim 11, wherein the inline container includes a plurality of locking pins and the cap includes a plurality of locking notches, each of the plurality of locking notches being configured to at least partially receive a corresponding one of the plurality of locking pins.

13. A beverage system comprising:

a water source;

a carbon dioxide source; and an inline carbonator comprising:

a body comprising:

a water inlet configured to receive water from the water source;

a carbon dioxide inlet configured to receive carbon dioxide from the carbon dioxide source; and an outlet configured to discharge a carbonated water solution; and an inline mixer disposed within the body, the inline mixer defining an inner flow path configured to transport fluid in a first direction and an outer flow path configured to receive the fluid from the inner flow path and transport fluid in a second direction generally opposite the first direction, the inline mixer comprising:

a plurality of mixing units arranged in a stacked configuration and configured to combine the water and the carbon dioxide into the carbonated water solution, each of the plurality of mixing units comprising:

a funnel structure; and a mixing wall structure comprising:

a barrier portion that is rotationally aligned with a funnel flow path associated with the funnel structure of the corresponding mixing unit of the plurality of mixing units.

14. The beverage system of claim 13, wherein:

the inline mixer further comprises:

a central channel in fluid communication with the water inlet and the carbon dioxide inlet, the central channel defining the inner flow path configured to transport the water and the carbon dioxide along the inline mixer in the first direction; and the plurality of mixing units define the outer flow path that is in fluid communication with the inner flow path, the outer flow path being configured to transport and combine the water and the carbon dioxide along the inline mixer in the second direction that is generally opposite the first direction.

15. The beverage system of claim 13, wherein the plurality of mixing units are positioned such that a funnel flow path of each of the plurality of mixing units is rotationally aligned with a funnel flow path of an adjacent one of the plurality of mixing units.

16. The beverage system of claim 13, wherein the plurality of mixing units are positioned such that a funnel flow path of each of the plurality of mixing units is rotationally offset relative with a funnel flow path of an adjacent one of the plurality of mixing units.

17. The beverage system of claim 13, wherein:

the barrier portion is a first barrier portion, and for each of the plurality of mixing units:

the funnel structure includes a first funnel flow path and a second funnel flow path;

the mixing wall structure further comprises:

a second barrier portion;

a first mixing wall flow path; and a second mixing wall flow path.

18. A method for carbonating water, the method comprising:

receiving water from a water supply at a first inlet of an inline carbonator;

receiving carbon dioxide from a carbon dioxide supply at a second inlet of an inline carbonator;

combining a flow of the water and a flow of the carbon dioxide within the inline carbonator to form a combined fluid flow; and sequentially directing the combined fluid flow:

through a central channel of the inline carbonator, the combined fluid flow flowing through the central channel in a first general direction; and through an outer flow path of the inline carbonator, the outer flow path being (i) located radially outward from the central channel, (ii) configured to receive the combination of the flow of the water and the flow of the carbon dioxide from the central channel, and (iii) comprising a funnel defining a funnel flow path and a mixing wall comprising a barrier portion and a mixing wall flow path, the combined fluid flow flowing through the outer flow path in a second general direction opposite the first general direction.

19. The method of claim 18, wherein directing the combined fluid flow through the outer flow path of the inline carbonator causes the combined fluid flow to:

flow through the funnel in the second general direction via the funnel flow path;

exit the funnel and impact the barrier portion of the mixing wall;

flow along the barrier portion in a direction at least partially perpendicular to the second general direction; and flow through the mixing wall flow path at least partially in the second general direction to pass the mixing wall.

* * * * *